(12) United States Patent
Yamamoto et al.

(10) Patent No.: US 9,327,591 B2
(45) Date of Patent: May 3, 2016

(54) ELECTRICALLY POWERED VEHICLE AND METHOD FOR CONTROLLING SAME

(75) Inventors: Masaya Yamamoto, Kasugai (JP); Jun Yasue, Toyota (JP)

(73) Assignees: TOYOTA JIDOSHA KABUSHIKI KAISHA, Toyota-Shi (JP); DENSO CORPORATION, Kariya-Shi (JP)

( * ) Notice: Subject to any disclaimer, the term of this patent is extended or adjusted under 35 U.S.C. 154(b) by 714 days.

(21) Appl. No.: 13/699,049

(22) PCT Filed: May 16, 2011

(86) PCT No.: PCT/JP2011/061154
§ 371 (c)(1),
(2), (4) Date: Nov. 20, 2012

(87) PCT Pub. No.: WO2011/145546
PCT Pub. Date: Nov. 24, 2011

(65) Prior Publication Data
US 2013/0062941 A1    Mar. 14, 2013

(30) Foreign Application Priority Data

May 20, 2010    (JP) .................................. 2010-116142

(51) Int. Cl.
*B60R 16/03*    (2006.01)
*B60K 6/445*    (2007.10)
(Continued)

(52) U.S. Cl.
CPC .............. *B60K 6/445* (2013.01); *B60L 3/0046* (2013.01); *B60L 3/0092* (2013.01); *B60L 11/123* (2013.01); *B60L 11/14* (2013.01); *B60L 11/1816* (2013.01); *B60L 11/1862* (2013.01); *B60W 10/26* (2013.01); *F02D 29/02* (2013.01);
*B60L 2210/12* (2013.01); *B60L 2210/14* (2013.01); *B60L 2240/36* (2013.01); *B60L 2240/421* (2013.01);
(Continued)

(58) Field of Classification Search
CPC ..... B60W 10/26; B60W 10/06; B60W 20/00; B60W 11/18; B60L 11/14; B60K 6/445; F02D 29/02; F02N 11/04
USPC ............. 307/9.1, 10.1, 10.2, 10.3, 10.4, 10.5, 307/10.6, 10.7, 10.8
See application file for complete search history.

(56) References Cited

U.S. PATENT DOCUMENTS

2009/0322503 A1*   12/2009   Suzuki ................... B60K 6/445
                                                    340/438
2010/0100264 A1    4/2010   Kato

FOREIGN PATENT DOCUMENTS

JP    2000-030753 A    1/2000
JP    2004-271410 A    9/2004
(Continued)

*Primary Examiner* — Thienvu Tran
*Assistant Examiner* — David M Stables
(74) *Attorney, Agent, or Firm* — Kenyon & Kenyon LLP

(57) ABSTRACT

The SOC of a power storage device provided in an electrically powered vehicle is controlled not to fall out of a SOC control range. When a SOC estimate value reaches a control lower limit value during vehicle traveling, a power generating structure provided in the vehicle starts to charge the power storage device. In the case of low temperature and/or deterioration of the power storage device, i.e., in the case where decrease of performance of the power storage device is concerned, the control lower limit value is increased as compared with that in a normal state. As a result, decrease of driveability and decrease of startability of an engine in the hybrid vehicle, both otherwise caused by insufficient output electric power from the power storage device, can be avoided.

8 Claims, 14 Drawing Sheets

(51) Int. Cl.
  *B60L 3/00*    (2006.01)
  *B60L 11/12*   (2006.01)
  *B60L 11/14*   (2006.01)
  *B60L 11/18*   (2006.01)
  *B60W 10/26*   (2006.01)
  *F02D 29/02*   (2006.01)
  *B60W 20/00*   (2016.01)

(52) U.S. Cl.
  CPC ........... *B60L 2240/423* (2013.01); *B60W 20/00* (2013.01); *B60W 2510/244* (2013.01); *B60W 2510/246* (2013.01); *Y02T 10/6217* (2013.01); *Y02T 10/6239* (2013.01); *Y02T 10/642* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 10/7225* (2013.01); *Y02T 10/7233* (2013.01); *Y02T 90/127* (2013.01); *Y02T 90/14* (2013.01)

(56) References Cited

FOREIGN PATENT DOCUMENTS

| | | |
|---|---|---|
| JP | 2007-062640 A | 3/2007 |
| JP | 2007-186038 A | 7/2007 |
| JP | 2010-104096 A | 5/2010 |

* cited by examiner

ELECTRICALLY POWERED VEHICLE AND METHOD FOR CONTROLLING SAME

This is a 371 national phase application of PCT/JP2011/061154 filed 16 May 2011, which claims priority to Japanese Patent Application No. 2010-116142 filed 20 May 2010, the contents of which are incorporated herein by reference.

TECHNICAL FIELD

The present invention relates to an electrically powered vehicle and a method for controlling the electrically powered vehicle, more particularly, charging and discharging control for a power storage device in an electrically powered vehicle including a structure for charging the power storage device during vehicle traveling.

BACKGROUND ART

Conventionally, among electrically powered vehicles capable of generating vehicle driving power using electric power from power storage devices provided therein, there has been used an electrically powered vehicle including a power generating structure that charges the power storage device during vehicle traveling. A representative example thereof is a hybrid vehicle that employs an output of its internal combustion engine to generate electric power to charge the power storage device provided in the vehicle. An alternative example thereof is a fuel cell vehicle having a fuel cell mounted thereon because such a fuel cell vehicle is capable of charging its power storage device using a fuel cell during vehicle traveling and therefore can be regarded as a hybrid vehicle in a broad sense.

In the description below, a vehicle employing electric power from its power storage device to generate vehicle driving power and including a power generating structure for charging the power storage device of the vehicle during vehicle traveling will be referred to as "hybrid type electrically powered vehicle".

In such a hybrid type electrically powered vehicle, charging and discharging of the power storage device are performed repeatedly during traveling. Accordingly, control is required to manage a state of charge (SOC) of the power storage device during the vehicle traveling. Generally, using the above-described power generating structure, the power storage device is appropriately charged during the vehicle traveling, thereby controlling the SOC so as not to fall out of a predetermined control range.

As one manner of controlling the SOC in such an electrically powered vehicle, Japanese Patent Laying-Open No. 2007-62640 (PTL 1) describes a hybrid vehicle that controls the SOC of its power storage device in consideration of status of use of electric power in a destination. According to PTL 1, in consideration of the status of use of electric power in the destination, a driver sets a target SOC. Thereafter, traveling is started with the power storage device of the vehicle being in a fully charged state. Until the SOC reaches the target SOC, an EV (Electric Vehicle) mode is selected such that the traveling is performed using only a motor generator with the engine being stopped. After the SOC reaches the target SOC, transition is made to a HV (Hybrid Vehicle) mode in which the traveling is performed using the engine and the motor generator. In this way, the SOC of the power storage device is maintained at the target SOC.

CITATION LIST

Patent Literature

PTL 1: Japanese Patent Laying-Open No. 2007-62640

SUMMARY OF INVENTION

Technical Problem

In PTL 1, the SOC of the power storage device in the HV traveling mode is controlled to be maintained at the target SOC set by the driver.

However, it is known that performance of a secondary battery, which is representatively used as the power storage device, has a temperature dependency. It is also generally known that the performance of the secondary battery is decreased as deterioration thereof proceeds. Hence, unless such changes in the performance are sufficiently reflected in controlling the SOC, a desired output cannot be secured particularly when the SOC is decreased, with the result that driveability of the electrically powered vehicle may be decreased.

The present invention has been made to solve such a problem and has its object to appropriately control a state of charge of a power storage device of an electrically powered vehicle in reflection of a change in performance of the power storage device so as not to compromise driveability thereof.

Solution to Problem

In a certain aspect of the present invention, an electrically powered vehicle includes: a first motor serving as a driving power source; a power storage device configured to send/receive electric power to/from the first motor; a power generating structure for generating charging power for the power storage device during vehicle traveling; a charge state estimating unit; a deterioration diagnosis unit; and a charging/discharging control unit. The charge state estimating unit is configured to estimate a remaining amount in the power storage device based on a state value of the power storage device. The deterioration diagnosis unit is configured to obtain a deterioration parameter indicating a deterioration state of the power storage device. The charging/discharging control unit is configured to control charging/discharging of the power storage device such that the remaining amount estimate value provided by the charge state estimating unit does not fall out of a control range during the vehicle traveling. The charging/discharging control unit includes a control range setting unit for setting the control range of the remaining amount estimate value, and a charging command unit. The charging command unit causes the power generating structure to generate the charging power at least when the remaining amount estimate value reaches a lower limit value of the control range. The control range setting unit increases the lower limit value from a first value to a second value when at least one of a first condition and a second condition is established, the first condition being such that a temperature of the power storage device is lower than a predetermined temperature, the second condition being such that the deterioration parameter reaches a predetermined level.

Preferably, the control range setting unit sets the lower limit value of the control range in accordance with a total of the first value, which is a default value, a first modification amount set to be variable according to the temperature of the power storage device, and a second modification amount set to be variable according to the deterioration parameter.

Further preferably, the electrically powered vehicle further includes an internal combustion engine serving as a driving power source. The power generating structure includes a second motor configured to generate the charging power through electric power generation that employs an output of the internal combustion engine and start the internal combustion engine using electric power from the power storage device, More preferably, the charging/discharging control unit further includes an upper limit value setting unit. The upper limit value setting unit is configured to set a charging power upper limit value and a discharging power upper limit value in a present state of the power storage device at least based on the remaining amount estimate value and the temperature of the power storage device. When at least one of the first and second conditions is established and the discharging power upper limit value of the power storage device is lower than a criterion value, the charging command unit is configured to cause the power generating structure to generate the charging power.

Further preferably, the criterion value is set at a value having a margin for electric power required and consumed when starting the internal combustion engine from a stop state using the second motor.

Preferably, the electrically powered vehicle further includes: an internal combustion engine serving as a driving power source; an externally charging structure configured to charge the power storage device using an electric power source external to the vehicle; and a traveling mode selecting unit. The traveling mode selecting unit is configured to select a first traveling mode until the remaining amount estimate value is decreased to a mode determination value and to select a second traveling mode after the remaining amount estimate value is decreased to the mode determination value, the first traveling mode being such that the traveling is performed actively using electric power accumulated in the power storage device, the second traveling mode being such that the traveling is performed to maintain the electric power accumulated in the power storage device. The control range is set in accordance with a combination of a control center value and a predetermined control width of the remaining amount. In the first traveling mode, the control range setting unit changes the control center value within a range not exceeding a setting lower limit value (SOCrmin), in accordance with the remaining amount estimate value, and in the second traveling mode, the control range setting unit sets the control center value at a constant value. When at least one of the first and second conditions is established, the control range setting unit increases the setting lower limit value in the first traveling mode as compared with the setting lower limit value when both the first and second conditions are not established.

Particularly in such a configuration, the control range setting unit increases the mode determination value, when at least one of the first and second conditions is established in the first traveling mode. Alternatively, the control range setting unit increases the constant value when at least one of the first and second conditions is established in the second traveling mode.

In another aspect of the present invention, there is provided a method for controlling an electrically powered vehicle including a first motor, a power storage device, and a power generating structure, the first motor serving as a driving power source, the power storage device being configured to send/receive electric power to/from the first motor, the power generating structure being for generating charging power for the power storage device during vehicle traveling. The method includes the steps of: calculating a remaining amount estimate value in the power storage device based on a state value of the power storage device; obtaining a deterioration parameter (DP) indicating a deterioration state of the power storage device; setting a control range for the remaining amount estimate value; and commanding the power generating structure to generate the charging power at least when the remaining amount estimate value reaches a lower limit value of the control range. The step of setting includes the step of increasing the lower limit value from a first value to a second value when at least one of a first condition and a second condition is established, the first condition being such that a temperature of the power storage device is lower than a predetermined temperature, the second condition being such that the deterioration parameter obtained reaches a predetermined level.

Preferably, the step of setting includes the step of setting the lower limit value of the control range in accordance with a total of the first value, which is a default value, a first modification amount set to be variable according to the temperature of the power storage device, and a second modification amount set to be variable according to the deterioration parameter.

More preferably, the method further includes the step of setting a charging power upper limit value and a discharging power upper limit value in a present state of the power storage device, at least based on the remaining amount estimate value and the temperature of the power storage device. When at least one of the first and second conditions is established and the discharging power upper limit value of the power storage device is lower than a criterion value, the step of commanding includes the step of causing the power generating structure to generate the charging power.

Further preferably, the electrically powered vehicle further includes an internal combustion engine serving as a driving power source. The power generating structure includes a second motor configured to generate the charging power through electric power generation that employs an output of the internal combustion engine and start the internal combustion engine using electric power from the power storage device.

More preferably, the step of commanding sets the criterion value at a value having a margin for electric power required and consumed when starting the internal combustion engine from a stop state using the second motor.

Preferably, the electrically powered vehicle further includes an internal combustion engine serving as a driving power source, and an externally charging structure configured to charge the power storage device using an electric power source external to the vehicle. The method further includes the step of selecting a first traveling mode until the remaining amount estimate value is decreased to a mode determination value, and a second traveling mode after the remaining amount estimate value is decreased to the mode determination value, the first traveling mode being such that the traveling is performed actively using electric power accumulated in the power storage device, the second traveling mode being such that the traveling is performed to maintain the electric power accumulated in the power storage device. The control range is set in accordance with a combination of a control center value and a predetermined control width of the remaining amount estimate value. The step of setting includes the steps of: in the first traveling mode, changing the control center value within a range not exceeding a setting lower limit value, in accordance with the remaining amount estimate value; in the second traveling mode, setting the control center value at a constant value; and when at least one of the first and second conditions is established, increasing the setting lower limit value as compared with the setting lower limit value when both the first and second conditions are not established.

Particularly in such a configuration, the step of setting increases the mode determination value in the first traveling mode when at least one of the first and second conditions is established. Alternatively, the step of setting increases the constant value in the second traveling mode when at least one of the first and second conditions is established.

ADVANTAGEOUS EFFECTS OF INVENTION

According to the present invention, the state of charge of the power storage device provided in the vehicle is controlled appropriately in reflection of a change in performance of the power storage device, thereby avoiding driveability of the electrically powered vehicle from being compromised due to insufficient output electric power from the power storage device.

DESCRIPTION OF EMBODIMENTS

Figure 1:
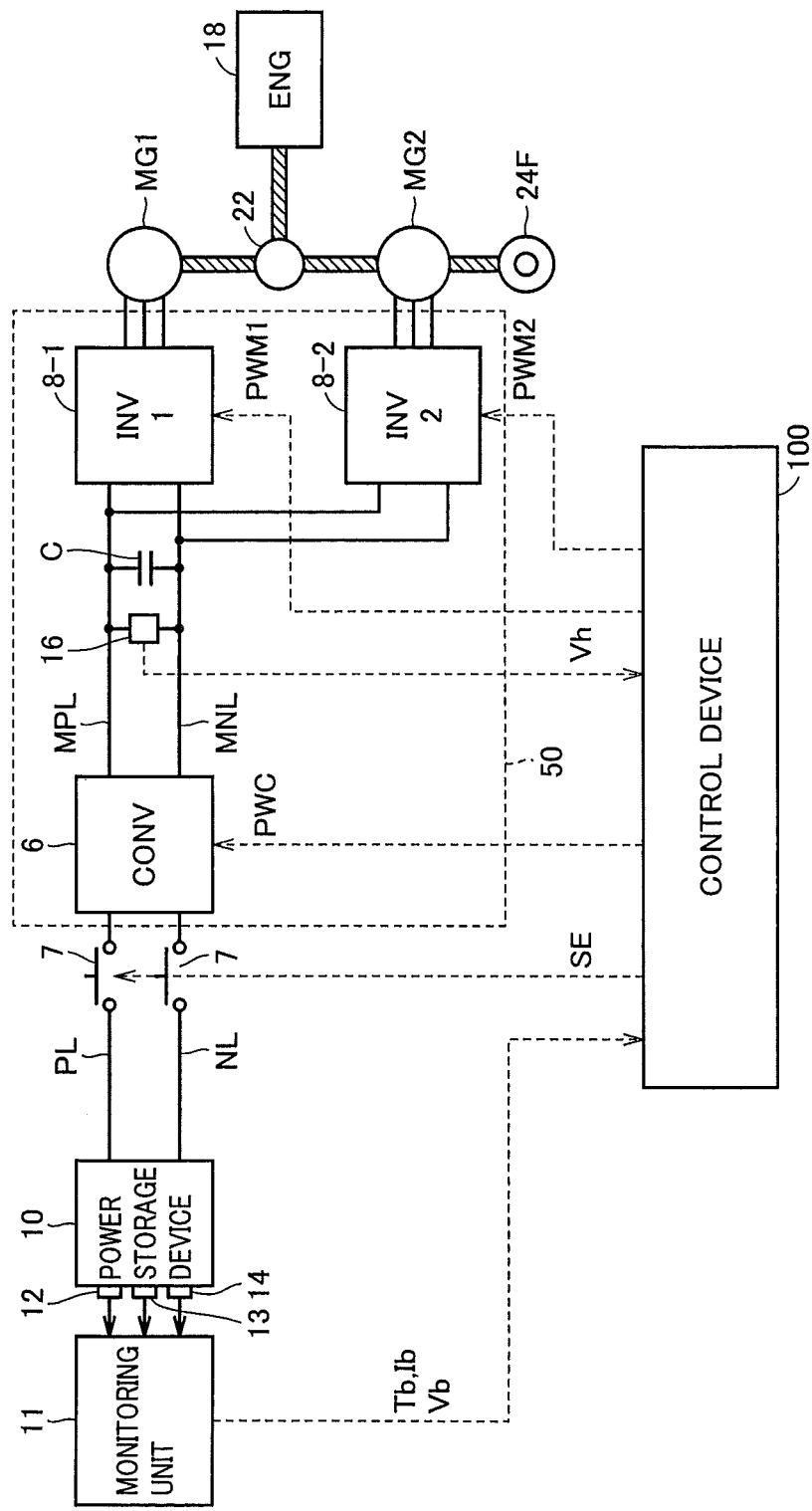
FIG. 1 is a schematic configuration diagram of a hybrid vehicle illustrated as a representative example of an electrically powered vehicle in a first embodiment of the present invention.

The following describes embodiments of the present invention in detail with reference to figures. It should be noted that in the below-mentioned figures, the same or corresponding portions are given the same reference characters and are not described repeatedly in principle.

[First Embodiment]

FIG. 1 is a schematic configuration diagram of a hybrid vehicle 5 illustrated as a representative example of an electrically powered vehicle according to a first embodiment of the present invention.

Referring to FIG. 1, hybrid vehicle 5 includes an engine (internal combustion engine) 18 and motor generators MG1, MG2. Hybrid vehicle 5 further includes a power storage device 10 capable of sending/receiving electric power to/from motor generators MG1, MG2.

Power storage device 10 is a re-dischargeable power storage element. Representatively, a secondary battery is applied thereto, such as a lithium ion battery or a nickel hydride battery. Alternatively, power storage device 10 may be constructed by a power storage element other than a battery, such as an electric double layer capacitor. FIG. 1 shows a system configuration associated with charging and discharging control for power storage device 10 in hybrid vehicle 5.

A monitoring unit 11 detects a "state value" of power storage device 10 based on respective outputs of a temperature sensor 12, a voltage sensor 13, and a current sensor 14 provided in power storage device 10. Specifically, the "state value" at least includes a temperature Tb of power storage device 10. As required, the state value further includes a voltage Vb and/or a current Ib of power storage device 10. Because the secondary battery is representatively used as power storage device 10 as described above, temperature Tb, voltage Vb, and current Ib of power storage device 10 will be also referred to as "battery temperature Tb", "battery voltage Vb", and "battery current Ib". Furthermore, battery temperature Tb, battery voltage Vb, and battery current Ib are also collectively referred to as "battery data".

Temperature sensor 12, voltage sensor 13, and current sensor 14 comprehensively represent temperature sensors, voltage sensors, and current sensors provided in power storage device 10, respectively. In other words, actually, a plurality of temperature sensors 12, voltage sensors 13, and/or current sensors 14 are generally provided.

Engine 18, motor generator MG1, and motor generator MG2 are mechanically coupled to one another via a power split device 22.

Figure 2:
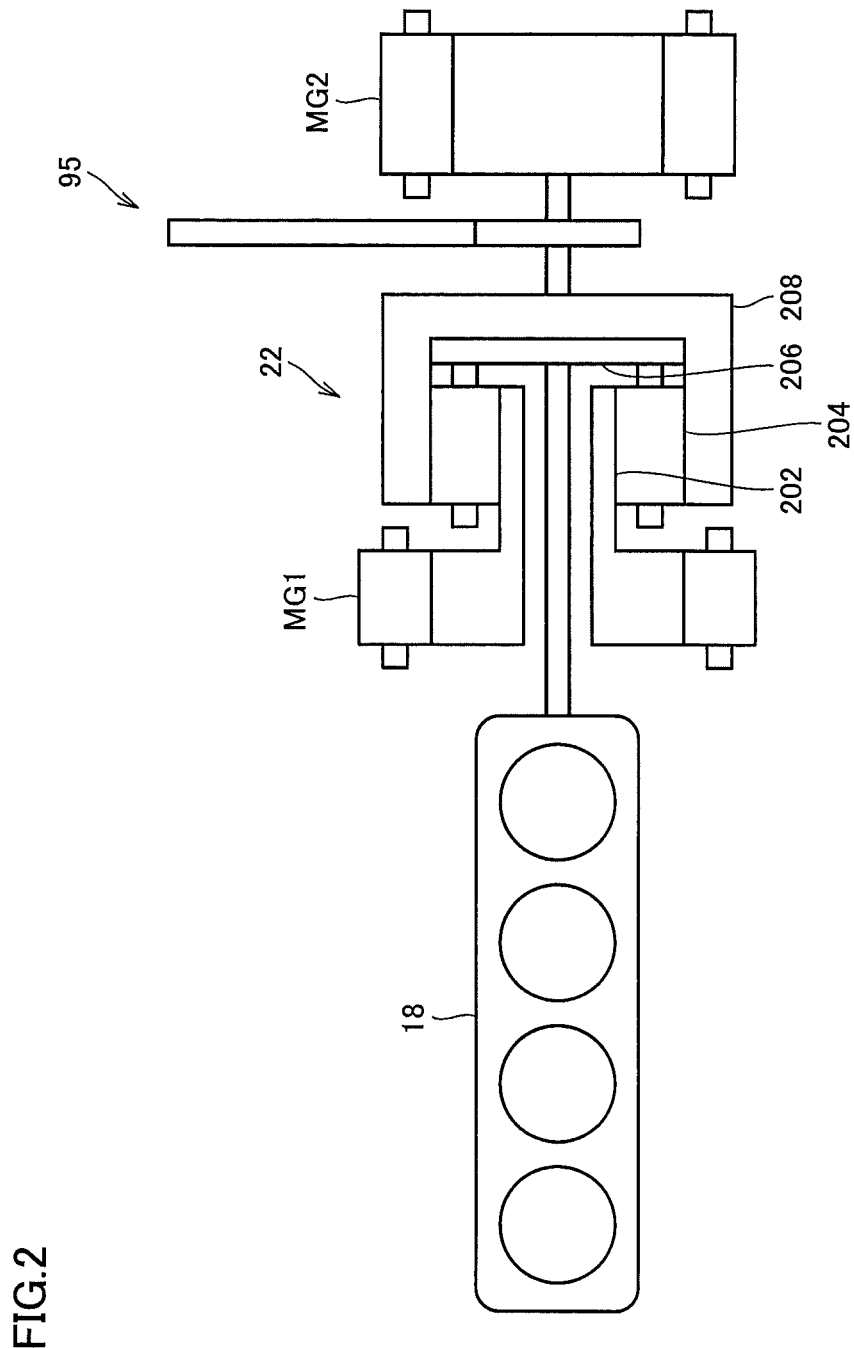
FIG. 2 is a schematic diagram of a power split device shown in FIG. 1.

Referring to FIG. 2, power split device 22 will be described more. Power split device 22 is constituted of a planetary gear including a sun gear 202, pinion gears 204, a carrier 206, and a ring gear 208.

Pinion gears 204 engage with sun gear 202 and ring gear 208. Carrier 206 rotatably supports pinion gears 204. Sun gear 202 is coupled to a rotation shaft of motor generator MG1. Carrier 206 is coupled to a crankshaft of engine 18. Ring gear 208 is coupled to a rotation shaft of motor generator MG2 and a speed reducer 95.

Figure 3:
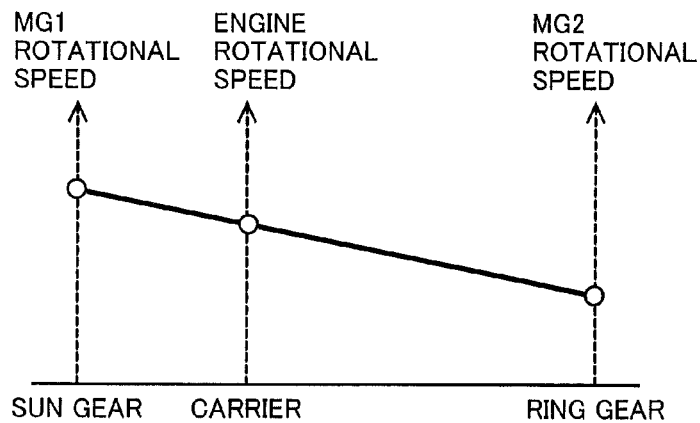
FIG. 3 is a nomographic chart of the power split device.

Engine 18, motor generator MG1, and motor generator MG2 are coupled to one another via power split device 22 constituted of the planetary gear. Accordingly, rotational speeds of engine 18, motor generator MG1, and motor generator MG2 are in a relation such that they are connected to one another in a straight line in a nomographic chart as shown in FIG. 3.

As a result, during traveling of hybrid vehicle 5, power split device 22 splits driving power generated by operation of engine 18 into two, one of which is distributed to motor generator MG1 and the other of which is distributed to motor generator MG2. The driving power distributed from power split device 22 to motor generator MG1 is used for an operation of generating electric power. On the other hand, the driving power distributed to motor generator MG2 is combined with driving power generated by motor generator MG2, and is then used to drive driving wheels 24F.

As such, in accordance with a traveling state of hybrid vehicle 5, the driving power is distributed and combined among the above-described three components by means of power split device 22, thereby driving driving wheels 24F. Further, during traveling of hybrid vehicle 5, power storage device 10 can be charged with electric power generated by motor generator MG1 using an output of engine 18. Thus, engine 18 corresponds to an "internal combustion engine" and motor generator MG2 corresponds to a "first motor". Further, motor generator MG1 corresponds to a "power generating structure" and a "second motor".

Referring to FIG. 1 again, hybrid vehicle 5 further includes a power control unit 50. Power control unit 50 is configured to bidirectionally convert electric power between power storage device 10 and each of motor generator MG1 and motor generator MG2. Power control unit 50 includes a converter (CONV) 6, and a first inverter (INV1) 8-1 and a second inverter (INV2) 8-2 respectively associated with motor generators MG1 and MG2.

Converter (CONV) 6 is configured to bidirectionally convert DC voltage between power storage device 10 and a positive bus MPL, which transfers a DC link voltage of each of inverters 8-1, 8-2. Namely, the input/output voltage of power storage device 10 and the DC voltage between positive bus MPL and negative bus MNL are bidirectionally stepped up or down. The operation of stepping up or down in converter 6 is controlled by a switching command PWC from a control device 100. Further, a smoothing capacitor C is connected between positive bus MPL and negative bus MNL. Further, a DC voltage Vh between positive bus MPL and negative bus MNL is detected by a voltage sensor 16.

Each of first inverter 8-1 and second inverter 8-2 bidirectionally converts electric power between the DC power of positive bus MPL and negative bus MNL and the AC power supplied to/from motor generators MG1 and MG2. Mainly, in accordance with a switching command PWM1 from control device 100, first inverter 8-1 converts AC power generated by motor generator MG1 using the output of engine 18 into DC power, and supplies it to positive bus MPL and negative bus MNL. In this way, even during vehicle traveling, power storage device 10 can be actively charged using the output of engine 18.

Further, when starting engine 18, in accordance with switching command PWM1 from control device 100, first inverter 8-1 converts DC power supplied from power storage device 10 into AC power, and supplies it to motor generator MG1. In this way, engine 18 can be started using motor generator MG1 as a starter.

In accordance with a switching command PWM2 from control device 100, second inverter 8-2 converts DC power supplied via positive bus MPL and negative bus MNL into AC power, and supplies it to motor generator MG2. In this way, motor generator MG2 generates driving power for hybrid vehicle 5.

Meanwhile, during regenerative braking of hybrid vehicle 5, motor generator MG2 generates AC power as the speed of driving wheels 24F is reduced. In doing so, in accordance with switching command PWM2 from control device 100, second inverter 8-2 converts the AC power generated by motor generator MG2 to DC power, and supplies it to positive bus MPL and negative bus MNL. Accordingly, while reducing speed or traveling down a sloping road, power storage device 10 is charged.

Between power storage device 10 and power control unit 50, system main relays 7 are provided which are inserted in and connected to a positive line PL and a negative line NL. Each of system main relays 7 is turned on/off in response to a relay control signal SE from control device 100. System main relay 7 is employed as a representative example of an "opening/closing device" capable of interrupting the charging/discharging path for power storage device 10. Any type of opening/closing device can be employed instead of system main relay 7.

Control device 100 is representatively constituted of an electronic control unit (ECU). The ECU is mainly constituted of a CPU (Central Processing Unit); a memory area such as a RAM (Random Access Memory) or a ROM (Read Only Memory); and an input/output interface. In control device 100, the CPU reads out, to the RAM, a program stored in advance in the ROM and executes it, thereby performing control associated with vehicle traveling and charging/discharging. It should be noted that at least a part of the ECU may be configured to perform predetermined mathematical/logical computations using hardware such as an electronic circuit.

As exemplary information sent to control device 100, FIG. 1 illustrates the battery data (battery temperature Tb, battery voltage Vb, and battery current Ib) as well as DC voltage Vh. The battery data is provided from monitoring unit 11 and DC voltage Vh is provided from voltage sensor 16 positioned between the lines of positive bus MPL and negative bus MNL. Although not shown in the figure, a current detection value of each phase of motor generators MG1, MG2 and a rotation angle detection value of each of motor generators MG1, MG2 are also sent to control device 100.

Figure 4:
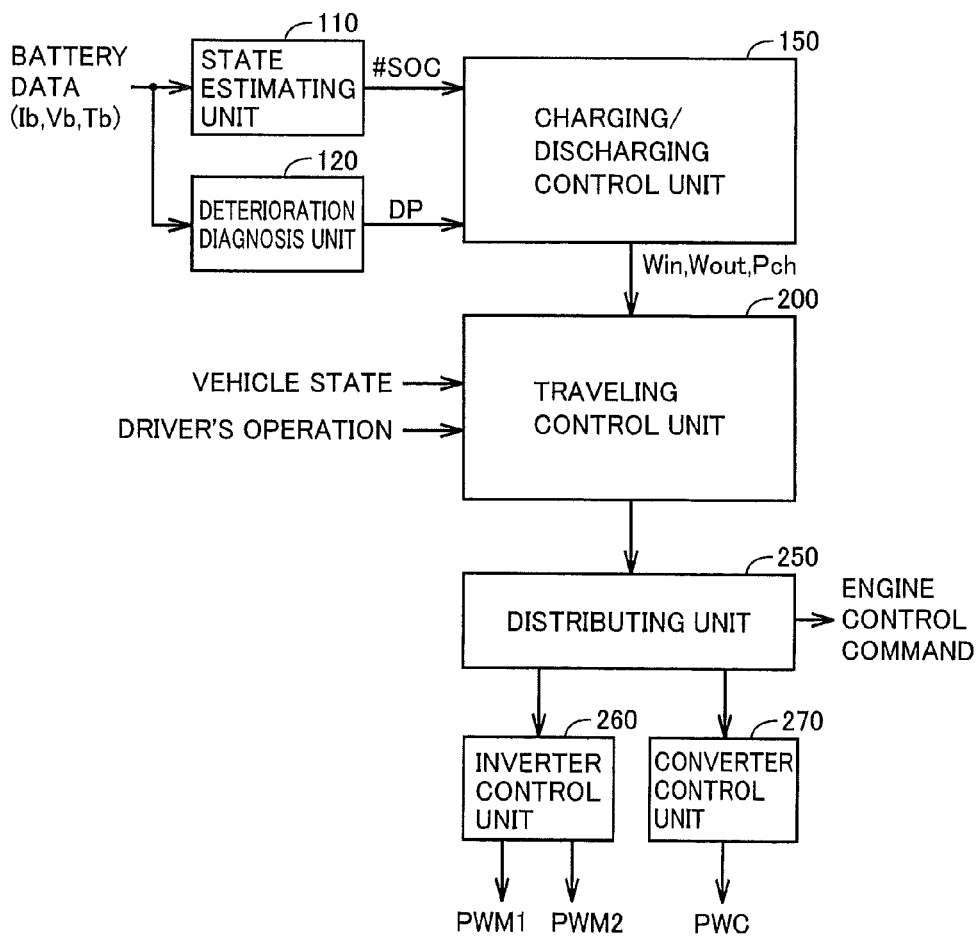
FIG. 4 is a function block diagram illustrating charging and discharging control for a power storage device provided in the electrically powered vehicle according to the first embodiment of the present invention.

FIG. 4 is a function block diagram illustrating charging and discharging control for the power storage device in the electrically powered vehicle according to the first embodiment of the present invention. It should be noted that each functional block in each of the below-mentioned block diagrams inclusive of FIG. 4 can be implemented by control device 100 performing software processing in accordance with a program set in advance. Alternatively, a circuit (hardware) having a function corresponding to the functional block can be provided in control device 100.

Referring to FIG. 4, a state estimating unit 110 estimates a SOC of power storage device 10 based on the battery data (Tb, Ib, Vb) sent from monitoring unit 11. The SOC represents a ratio of a currently remaining amount of charges to a fully charged amount in percentage (0% to 100%). For example, state estimating unit 110 sequentially calculates an SOC estimate value (#SOC) of power storage device 10 based on an integrated value of the charging amount and discharging amount of power storage device 10. The integrated value of the charging amount and discharging amount is obtained by temporally integrating a product (electric power) of battery current Ib and battery voltage Vb. Alternatively, the SOC estimate value (#SOC) may be found based on a relation between an open circuit voltage (OCV) and the SOC.

Based on the battery data from monitoring unit 11, a deterioration diagnosis unit 120 calculates a deterioration parameter DP indicating a degree of deterioration of power storage device 10. As deterioration parameter DP, an internal resistance or the fully charged amount can be used. When the deterioration of power storage device 10 proceeds, the fully charged amount is decreased and the internal resistance is increased. It should be noted that the fully charged amount and the internal resistance can be calculated using a known technique described in, for example, Japanese Patent Laying-Open No. 2007-195312.

In the description below, it is defined in the present embodiment that the deterioration of power storage device 10 proceeds as the parameter value of deterioration parameter DP is decreased. In other words, deterioration parameter DP is coherently handled as a parameter value being decreased due to proceeding of the deterioration.

The SOC estimation is performed by state estimating unit 110 at a predetermined cycle during vehicle traveling of hybrid vehicle 5. On the other hand, deterioration diagnosis unit 120 does not need to perform the deterioration diagnosis, i.e., the calculation of deterioration parameter DP as frequent as the SOC estimation. For example, when ending the vehicle traveling of hybrid vehicle 5 (turning off an ignition switch), deterioration diagnosis unit 120 calculates deterioration parameter DP. In this way, whenever vehicle traveling of hybrid vehicle 5 is ended, deterioration parameter DP is updated based on data (battery data) obtained in the traveling. During vehicle traveling, deterioration diagnosis unit 120 reads out the parameter value calculated at the end of the previous traveling, thereby obtaining deterioration parameter DP.

Alternatively, the deterioration parameter may be obtained as a result of performing deterioration diagnosis of power storage device 10 using a dedicated battery checker or the like in an event such as regular inspection for hybrid vehicle 5, and the deterioration parameter thus obtained may be stored in the memory area of control device 100. In this case, deterioration diagnosis unit 120 can obtain deterioration parameter DP by making access to the memory area without directly performing the deterioration diagnosis.

The SOC estimate value (#SOC) calculated by state estimating unit 110 and deterioration parameter DP obtained by deterioration diagnosis unit 120 are sent to a charging/discharging control unit 150.

Based on the state of power storage device 10, charging/discharging control unit 150 sets a charging power upper limit value Win and a discharging power upper limit value Wout. Further, charging/discharging control unit 150 determines whether or not power storage device 10 needs to be charged, and sets a charging power command value Pch for power storage device 10. Charging power command value Pch is set to satisfy Pch=0 when power storage device 10 does not need to be charged. On the other hand, when it is determined that power storage device 10 needs to be charged, charging power command value Pch is set to satisfy Pch>0.

A traveling control unit 200 calculates vehicle driving power and vehicle braking power required in the entire hybrid vehicle 5, in accordance with the vehicle state of hybrid vehicle 5 and a driver's operation. The driver's operation includes an amount of stepping on an accelerator pedal (not shown), a position of a shift lever (not shown), an amount of stepping on a brake pedal (not shown), or the like.

Further, traveling control unit 200 determines output requests for motor generators MG1, MG2 and an output request for engine 18 in order to achieve the requested vehicle driving power or vehicle braking power. Hybrid vehicle 5 can travel only using the output of motor generator MG2 with engine 18 being stopped. Hence, by determining each of the output requests so as to avoid operation of engine 18 in a region with bad fuel consumption, energy efficiency can be increased. Further, the output requests for motor generators MG1, MG2 are set with charging/discharging of power storage device 10 being restricted in the range of electric power (Win to Wout) chargeable/dischargeable to/from power storage device 10. In other words, when the output electric power of power storage device 10 cannot be secured, the output of motor generator MG2 is restricted.

In accordance with the output requests for motor generators MG1, MG2 set by traveling control unit 200, a distributing unit 250 calculates torques and rotational speeds of motor generators MG1, MG2. Then, distributing unit 250 sends control commands regarding the torques and rotational speeds to an inverter control unit 260, and at the same time, sends a control command value regarding DC voltage Vh to a converter control unit 270.

Meanwhile, distributing unit 250 generates engine control commands indicating engine power and engine target rotational speed determined by traveling control unit 200. In accordance with each of the engine control commands, fuel injection, ignition timing, valve timing, and the like in engine 18 are controlled although they are not shown in the figures.

Inverter control unit 260 generates, in accordance with the control commands from distributing unit 250, switching commands PWM1 and PWM2 for driving motor generators MG1 and MG2. Switching commands PWM1 and PWM2 are respectively sent to inverters 8-1 and 8-2.

Converter control unit 270 generates a switching command PWC in accordance with the control command from distributing unit 250, so as to control DC voltage Vh. In accordance with switching command PWC, converter 6 converts voltage so as to control electric power charged to and discharged from power storage device 10.

In this way, traveling control for hybrid vehicle 5 is achieved to improve energy efficiency in accordance with the vehicle state and the driver's operation.

Figure 5:
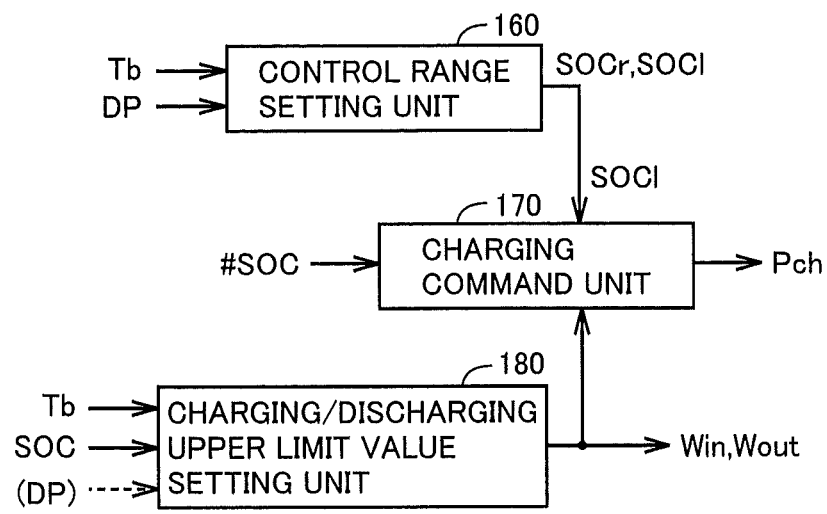
FIG. 5 is a function block diagram further illustrating a configuration of a charging/discharging control unit shown in FIG. 4.

FIG. 5 shows the configuration of charging/discharging control unit 150 (FIG. 4) more in detail.

Referring to FIG. 5, charging/discharging control unit 150 includes a control range setting unit 160, a charging command unit 170, and a charging/discharging upper limit value setting unit 180.

Charging/discharging upper limit value setting unit 180 sets charging power upper limit value Win and discharging power upper limit value Wout at least based on battery temperature Tb and the SOC estimate value (#SOC). As the SOC estimate value (#SOC) is lower, discharging power upper limit value Wout is set to be smaller. In contrast, as the SOC estimate value (#SOC) is higher, charging power upper limit value Win is set to be smaller.

Further, power storage device 10, which is a secondary battery or the like, has a temperature dependency such that the internal resistance is increased particularly when the temperature thereof is low. On the other hand, when the temperature thereof is high, it is necessary to prevent the temperature from increasing too high due to further heat generation. Hence, when the temperature is low and high, it is preferable to restrict the charging power and the discharging power. Thus, charging power upper limit value Win and discharging power upper limit value Wout are set in accordance with the SOC estimate value (#SOC) and battery temperature Tb.

Alternatively, charging/discharging upper limit value setting unit 180 may set charging power upper limit value Win and discharging power upper limit value Wout also in reflection of deterioration parameter DP. Specifically, charging power upper limit value Win and discharging power upper limit value Wout can be decreased in accordance with decrease of the deterioration parameter.

Control range setting unit 160 sets the SOC control range of power storage device 10 in accordance with battery temperature Tb and deterioration parameter DP. The SOC control range is set to have control widths for the upper limit side and the lower limit side relative to a control center value SOCr. In the description below, the lower limit of the SOC control range is referred to as "SOCl (control lower limit value)", and the upper limit of the SOC control range is referred to as "SOCu (control upper limit value)".

When the SOC estimate value (#SOC) is decreased to fall below the SOC control range set by control range setting unit 160, i.e., at least when #SOC<SOCl, charging command unit 170 commands charging of power storage device 10. In other words, Pch>0 is set. Alternatively, when SOCl<SOC#<SOCr, Pch>0 may be set in a preventive manner. When Pch>0, engine 18 is requested to operate. If engine 18 is being stopped, engine 18 is started. Then, charging power command value Pch is added to the engine output request.

Conversely, when the SOC estimate value (#SOC) is not decreased, charging command unit 170 sets Pch=0. On this occasion, engine 18 is not operated to charge power storage device 10. Further, when SOCr<SOC#<SOCu, Pch is set at a value for discharging to designate discharging of power storage device 10.

Further, when the SOC estimate value is close to control upper limit value SOCu, charging/discharging upper limit value setting unit 180 sets charging power upper limit value Win to be low as described above. On this occasion, regenerative power generation by motor generator MG2 is restricted or prohibited, thereby avoiding power storage device 10 from being overcharged. It should be noted that while the regenerative power generation is prohibited, braking power required for the entire hybrid vehicle 5 is generated only by a hydraulic brake structure not shown in the figures.

Thus, the SOC estimation and the setting of charging and discharging power upper limit values Win, Wout based on the SOC estimation are performed in reflection of the state value of power storage device 10 at present. Moreover, charging and discharging power upper limit values Win, Wout can be set in reflection of the battery temperature and the deterioration parameter, both of which have influence over the battery performance.

However, when the performance of power storage device 10 has been decreased (in the case of low temperature and/or deterioration), electric power that can be output may be significantly decreased in the low SOC region. Under such a circumstance, there is a possibility that the output of motor generator MG2 is restricted, with the result that fast responsiveness to the driver's acceleration request is lost. Accordingly, operationality of the vehicle may be decreased. Further, a degree of freedom in distributing the power may be decreased to result in decreased energy efficiency in the entire vehicle. Furthermore, when the temperature thereof is low, engine 18 may not be able to be started in response to a charging request.

In view of these, in the electrically powered vehicle of the first embodiment, the SOC control for power storage device 10 is switched in the following manner between the normal state and the decreased performance state in which decrease of output electric power is concerned.

Figure 6:
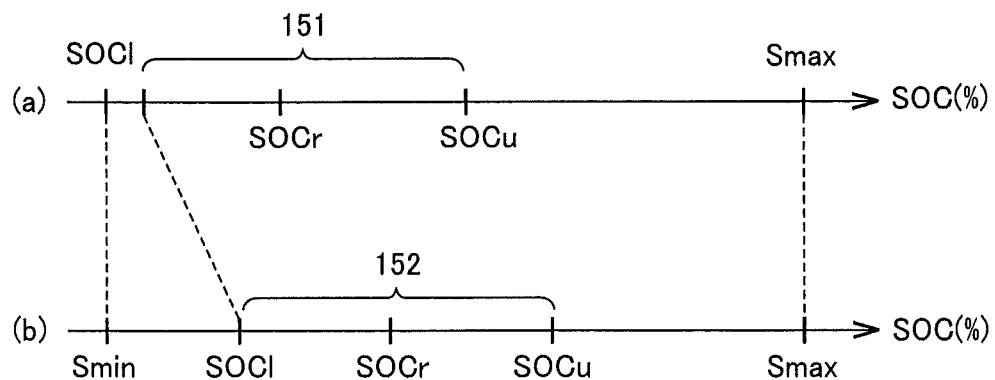
FIG. 6 is a conceptual view illustrating setting of a SOC control range by a control range setting unit shown in FIG. 5.

Referring to FIG. 6, the following fully describes the setting of the SOC control range by control range setting unit 160.

Referring to FIG. 6(*a*), SOC control range 151 is set to have control widths for the upper limit side and the lower limit side relative to control center value SOCr. As described above, charging/discharging of power storage device 10 is controlled to maintain the SOC estimate value (#SOC) between control upper limit value SOCu and control lower limit value SOCl.

For the SOC of power storage device 10, a management upper limit value Smax and a management lower limit value Smin are further set. Management upper limit value Smax and management lower limit value Smin correspond to charging and discharging limit values in the specification of power storage device 10 such that deterioration may drastically proceed when overcharging or overdischarging proceeds to exceed or fall below the values. Hence, SOC control range 151 needs to be set to fall within the range from management lower limit value Smin to management upper limit value Smax. Namely, control lower limit values SOCl and SOCu are set to have margins relative to management lower limit value Smin and management upper limit value Smax, respectively.

In the case of low temperature and/or deterioration with which the performance of power storage device 10 tends to be decreased, control range setting unit 160 changes the SOC control range from SOC control range 151 for the normal state in FIG. 6(*a*) to a SOC control range 152 shown in FIG. 6(*b*). A feature of SOC control range 152 (FIG. 6(*b*)) lies in that control lower limit value SOCl is increased as compared with that in SOC control range 151 (FIG. 6(*a*)).

Figure 7:
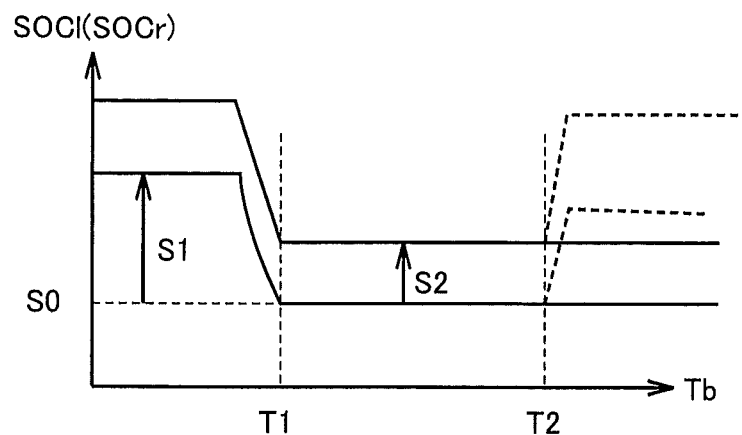
FIG. 7 is a conceptual view illustrating setting of a SOC control lower limit value relative to a battery temperature.

FIG. 7 is a conceptual view illustrating the setting of the SOC control range relative to battery temperature Tb.

Referring to FIG. 7, at a normal temperature of T1≤Tb≤T2, control lower limit value SOCl is set at S0, which is a default value. This corresponds to control lower limit value SOCl in SOC control range 151 of FIG. 6(*a*). In the normal state, discharging to a value near management lower limit value Smin is permitted to effectively use electric power accumulated in power storage device 10. Namely, S0 is set at a value near management lower limit value Smin while securing a margin for management lower limit value Smin.

Meanwhile, when battery temperature Tb is low (Tb<T1), control lower limit value SOCl is increased by a modification amount S1. Modification amount S1 may be a value variable according to battery temperature Tb. Further, also when the battery has a high temperature (Tb>T2), S1>0 can be set. Criterion values T1, T2 can be defined in advance based on the temperature dependency of the performance (for example, the internal resistance or the like) of power storage device 10.

Figure 8:
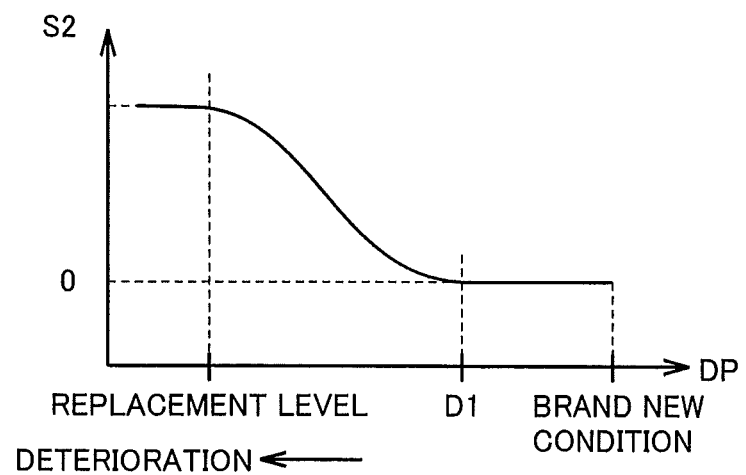
FIG. 8 is a conceptual view illustrating setting of the SOC control lower limit value in response to battery deterioration.

Further, in the case of battery deterioration, a modification amount S2 is added to control lower limit value SOCl. FIG. 8 shows setting of modification amount S2 depending on the battery deterioration.

Referring to FIG. 8, deterioration parameter DP decreases as deterioration proceeds from the brand new condition. When deterioration parameter DP≥D1, an influence provided by the deterioration is small. Hence, modification amount S2=0 is set.

Meanwhile, when deterioration parameter DP reaches predetermined level D1 (criterion value), modification amount S2 corresponding to deterioration parameter DP is set (S2>0). When the deterioration further proceeds such that deterioration parameter DP is decreased to reach a replacement level, a guidance urging replacement of power storage device 10 is presented to the user. Predetermined level D1 can be defined in advance by finding a relation (for example, a property concerned with output electric power that can be secured) between the deterioration parameter and the battery performance, by means of a deterioration test on power storage device 10.

Namely, criterion values T1, T2, D1 are threshold values for determining whether or not deterioration parameter DP and temperature Tb are in regions in which the performance of power storage device 10 is decreased to result in significant decrease of output electric power.

As shown in FIG. 7 and FIG. 8, when power storage device 10 is in a normal temperature state and the deterioration has not proceeded, S1=S2=0 is satisfied. Hence, control lower limit value SOCl=S0 (default value). On this occasion, SOC control range 151 shown in FIG. 6(a) is set. Meanwhile, in the case of low temperature and/or deterioration of power storage device 10 (hereinafter, also referred to as "in the case of decreased performance of power storage device 10"), at least one of modification amounts S1 and S2 is set to have a positive value (S1>0 and/or S2>0) in accordance with battery temperature Tb and/or deterioration parameter DP. As a result, with the modification amounts (S1+S2), control lower limit value SOCl is increased to be higher than default value S0. In other words, SOC control range 152 shown in FIG. 6(b) is set.

Figure 9:
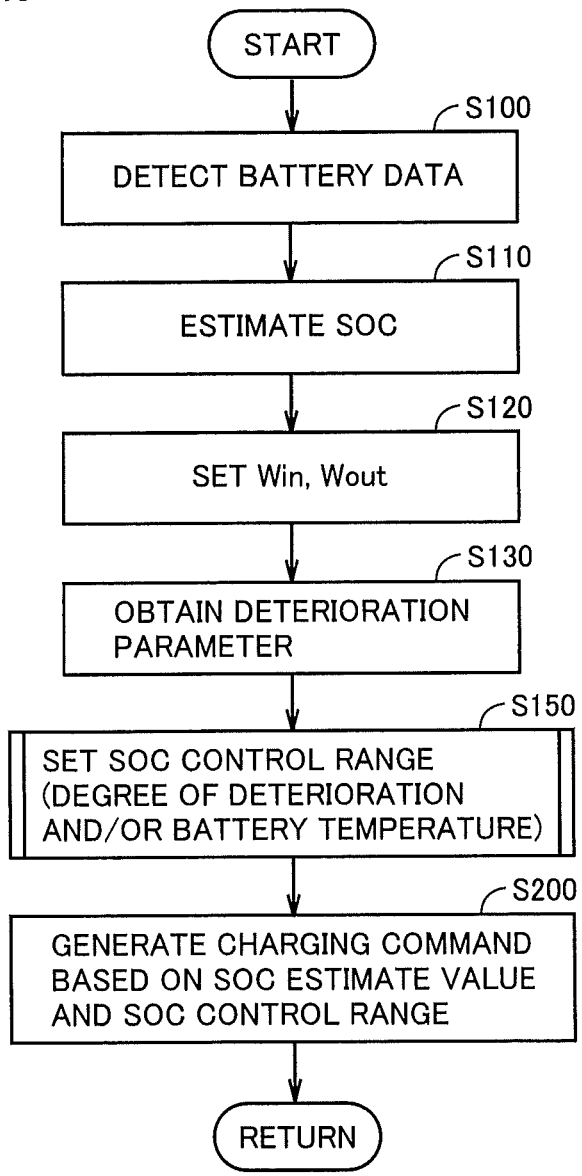
FIG. 9 is a flowchart showing a procedure of a control process for implementing the charging and discharging control for the power storage device provided in the electrically powered vehicle according to the first embodiment of the present invention.

FIG. 9 is a flowchart showing a procedure of a control process for implementing the charging control for the power storage device in the electrically powered vehicle according to the first embodiment of the present invention.

Referring to FIG. 9, in a step S100, control device 100 obtains the battery data (Tb, Ib, Vb) from monitoring unit 11. Then, in a step S110, control device 100 estimates the SOC of power storage device 10. Namely, the process in step S110 corresponds to the function of state estimating unit 110 shown in FIG. 4.

In a step S120, control device 100 sets charging power upper limit value Win and discharging power upper limit value Wout of power storage device 10 based on the SOC estimate value (#SOC) calculated in step S110 as well as battery temperature Tb. The process in step S120 corresponds to the function of charging/discharging upper limit value setting unit 180 of FIG. 5. Namely, the setting of charging power upper limit value Win and discharging power upper limit value Wout is the same as the setting made by charging/discharging upper limit value setting unit 180 of FIG. 5.

Further, in step S130, control device 100 obtains deterioration parameter DP that is based on deterioration diagnosis. The function in step S130 corresponds to the function of deterioration diagnosis unit 120 shown in FIG. 4. It should be noted that, as described above, the deterioration diagnosis by deterioration diagnosis unit 120 (cycle of calculating deterioration parameter DP) may not be performed for every execution cycle of the flowchart of FIG. 9. Namely, step S130 may be performed by reading, from the memory area, deterioration parameter DP calculated by deterioration diagnosis in past.

In a step S150, control device 100 sets the SOC control range based on the deterioration state (deterioration parameter DP) and/or the battery temperature (Tb) of power storage device 10. The process in step S150 corresponds to the function of control range setting unit 160 shown in FIG. 5.

Figure 10:
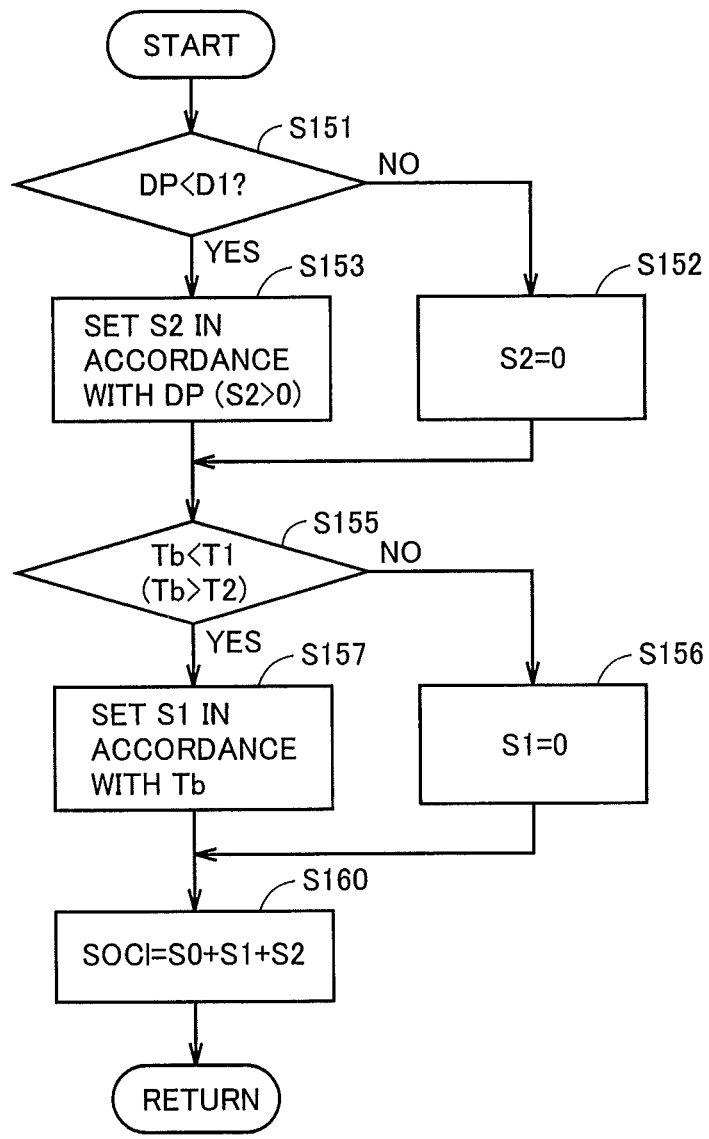
FIG. 10 is a flowchart illustrating a procedure of a process of setting the SOC control range in the first embodiment in detail.

FIG. 10 is a flowchart illustrating the process in step S150 of FIG. 9 more in detail.

Referring to FIG. 10, in a step S151, control device 100 compares deterioration parameter DP with criterion value D1 (FIG. 8). When DP has not been decreased to reach D1 (determined as NO in S151), control device 100 sets modification amount S2=0 in a step S152. On the other hand, when DP<D1 (determined as YES in S151), control device 100 sets modification amount S2 in a step S153 in accordance with deterioration parameter DP. In other words, S2>0 is set. For example, in accordance with a map prepared in advance based on the property illustrated in FIG. 8, modification amount S2 for deterioration parameter DP is set.

Following steps S151 to S153, control device 100 compares battery temperature Tb with criterion value T1 (FIG. 7) in a step S155. When battery temperature Tb is normal (determined as NO in S155), control device 100 sets modification amount S1=0 in a step S156. On the other hand, when the battery temperature is low (TB<T1 (FIG. 7)), i.e., when it is determined as YES in S155, control device 100 sets modification amount S1 in accordance with battery temperature Tb in a step S157. In other words, S1>0 is set. For example, in accordance with a map prepared in advance based on the property illustrated in FIG. 7, modification amount S1 for battery temperature Tb is set. It should be noted that, as described above, in step S155, it may be determined as YES also when the battery temperature is high (Tb>T2 (FIG. 7)).

Further, in a step S160, control device 100 sets the lower limit value (control lower limit value SOCl) of the SOC control range in accordance with a total of default value S0, modification amount S2 set in steps S151 and S152, and modification amount S1 set in steps S155 to S157.

Referring to FIG. 9 again, in a step S200, control device 100 generates a charging command based on the SOC estimate value (#SOC) calculated in step S110 and the SOC control range (FIG. 6(a) and FIG. 6(b)) set in step S150. Namely, the function in step S200 corresponds to the function of charging command unit 170 shown in FIG. 5.

Thus, according to the electrically powered vehicle in the first embodiment, in the case of decreased performance of power storage device 10 (in the case of low temperature and/or deterioration), the lower limit value of the SOC control range can be increased to be higher than that in the normal state. Accordingly, under the charging and discharging control, the SOC lower limit value is increased to be higher than that in the normal state. In this way, when it is difficult to secure the output electric power in the low SOC region due to the decreased performance of power storage device 10 (such as increase of the internal resistance), the low SOC region is avoided to secure the output electric power from power storage device 10. As a result, it is possible to avoid decrease of driveability of hybrid vehicle 5 and starting failure and decrease of startability of engine 18, which are otherwise caused by insufficient output electric power from power storage device 10. Meanwhile, in the case of normal state (in the case of normal temperature and no deterioration), electric power accumulated in power storage device 10 can be used up to the management lower limit region, thus improving energy efficiency (fuel consumption).

It should be noted that the setting of the SOC control range in the first embodiment is not limited to the above-described example as long as the lower limit value of the SOC control range can be increased. Specifically, control lower limit value SOCl may be directly changed in accordance with FIG. 7 and FIG. 8. Alternatively, control center value SOCr may be modified in accordance with FIG. 7 and FIG. 8 to accordingly increase control lower limit value SOCl.

Further, in FIG. 6(b), it is illustrated that the entire SOC control range is shifted to increase, but a similar effect can be obtained by only changing control lower limit value SOCl with control center value SOCr and/or control upper limit value SOCu being fixed. However, as illustrated in FIG. 6(b), overall charging/discharging management can be more smoothly performed when shifting the entire SOC control range.

[Second Embodiment]

In a second embodiment, the following describes application of the present invention to an electrically powered vehicle having a power storage device chargeable from an electric power source (hereinafter, also referred to as "external power source") external to the vehicle.

Figure 11:
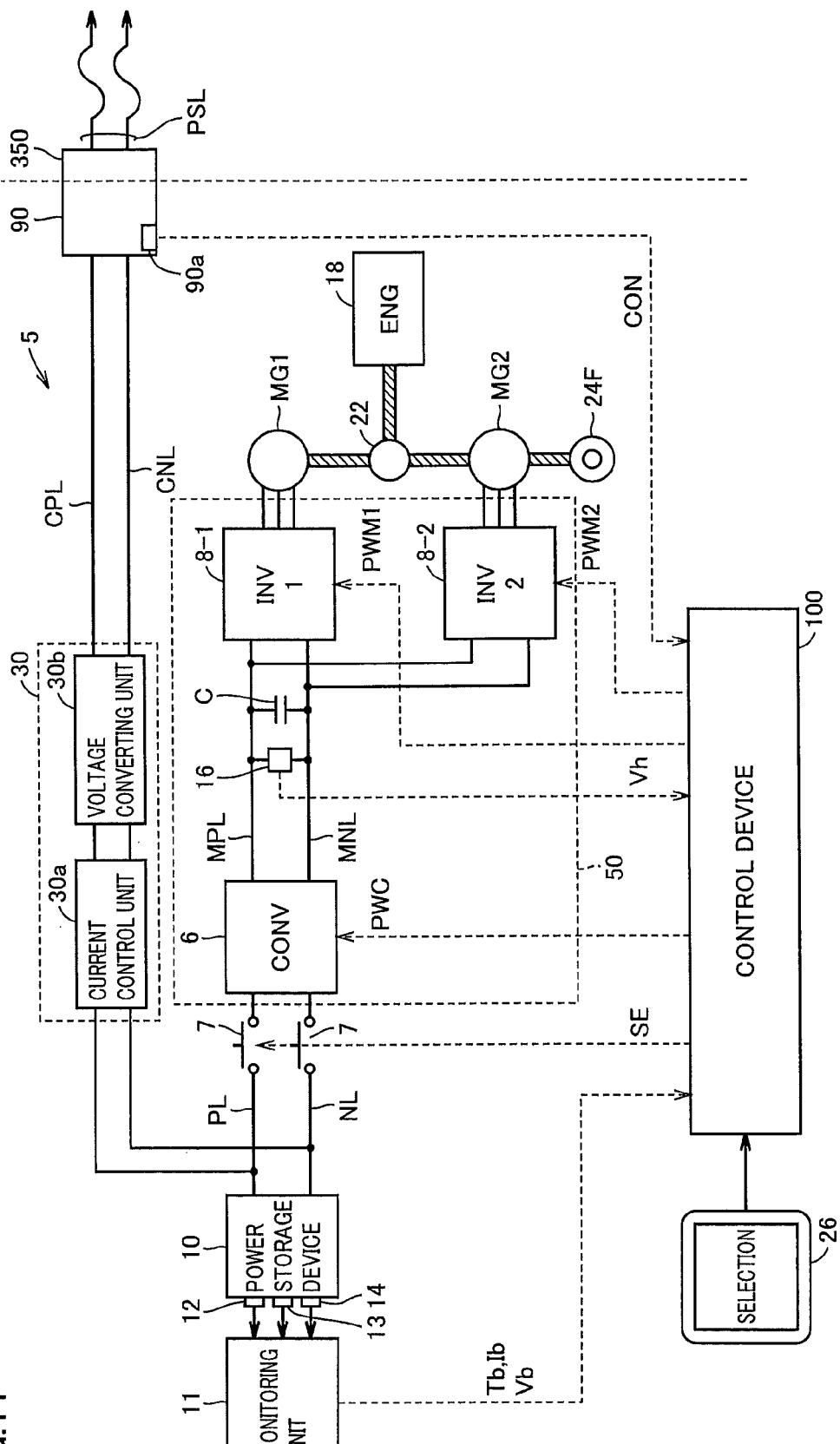
FIG. 11 is a schematic configuration diagram of a hybrid vehicle illustrated as a representative example of an electrically powered vehicle of a second embodiment of the present invention.

FIG. 11 is a schematic configuration diagram of a hybrid vehicle 5, which is illustrated as a representative example of the electrically powered vehicle according to the second embodiment of the present invention. Hybrid vehicle 5 according to the second embodiment is a so-called "plug-in type hybrid vehicle" having a power storage device chargeable from an external power source.

Referring to FIG. 11, in comparison to the hybrid vehicle shown in FIG. 1 in the first embodiment, hybrid vehicle 5 according to the second embodiment further includes a connector receiving portion 90 and an externally charging unit 30 both for charging power storage device 10 using an external power source. Further, a selection switch 26 is provided in the vicinity of the driver's seat so as to allow the user to forcibly select a below-described traveling mode.

In the description below, charging power storage device 10 using an external power source is also referred to as "external charging" and charging power storage device 10 using engine 18 and motor generator MG1 during traveling is also referred to as "internal charging" for discrimination of the respective charging operations.

A connector portion 350 is connected to connector receiving portion 90, thereby supplying electric power from the external power source to externally charging unit 30 via a positive charging line CPL and a negative charging line CNL. Connector receiving portion 90 includes a connection detection sensor 90a for detecting a connection state between connector receiving portion 90 and connector portion 350. In accordance with a connection signal CON from connection detection sensor 90a, control device 100 detects that hybrid vehicle is ready for charging from the external power source. It should be noted that the external power source is representatively constructed by a single-phase AC commercial power source. However, instead of or in addition to the commercial electric power, electric power generated by a solar panel installed on a roof of a house or the like may be supplied as the electric power of the external power source.

Connector portion 350 constitutes a connection structure for supplying the electric power from the external power source to hybrid vehicle 5. For example, connector portion 350 is connected to a charging station (not shown) having an external power source, via a power line PSL formed of a cabtire cable or the like. With connector portion 350 being connected to hybrid vehicle 5 during external charging, connector portion 350 electrically connects the external power source to externally charging unit 30 provided in hybrid vehicle 5. Meanwhile, hybrid vehicle 5 is provided with connector receiving portion 90 connected to connector portion 350 to receive electric power from the external power source.

It should be noted that instead of the configuration shown in FIG. 11, hybrid vehicle 5 may be configured to receive electric power supplied from the external power source by means of electromagnetic coupling without contact between the external power source and the vehicle, specifically, may be configured to receive electric power from the external power source by means of mutual inductance between a primary coil provided at the external power source side and a secondary coil provided at the vehicle side.

Externally charging unit 30 is a device for receiving electric power from the external power source and charging power storage device 10, and is provided between each of positive line PL and negative line NL and each of positive charging line CPL and negative charging line CNL. Externally charging unit 30 includes a current control unit 30a and a voltage converting unit 30b, and converts electric power supplied from the external power source into electric power suitable for charging power storage device 10.

Specifically, voltage converting unit 30b is a device for converting a voltage supplied from the external power source into a voltage suitable for charging power storage device 10. Representatively, voltage converting unit 30b is constituted of a winding wire type transformer having a predetermined transformation ratio, an AC-AC switching regulator, or the like. Further, current control unit 30a rectifies the AC voltage converted by voltage converting unit 30b, to generate a DC voltage. In addition, current control unit 30a controls a charging current to be supplied to power storage device 10, in accordance with a charging current command from control device 100. Current control unit 30a is representatively constituted of a bridge circuit of single phase. It should be noted that instead of the configuration including current control unit 30a and voltage converting unit 30b, externally charging unit 30 may be implemented using an AC-DC switching regulator or the like.

Thus, power storage device 10 of the electrically powered vehicle (hybrid vehicle 5) according to the second embodiment can be internally charged with electric power generated by motor generator MG1 during vehicle traveling and can be externally charged after ending the traveling. In such a plug-in type electrically powered vehicle, it is preferable to maintain engine 18 in a stop state as much as possible during traveling for the sake of energy efficiency. Hence, as with Japanese Patent Laying-Open No. 2007-62640 (PTL 1), two traveling modes, i.e., an EV mode and an HV mode are selectively applied in the electrically powered vehicle (hybrid vehicle 5) of the second embodiment.

Figure 12:
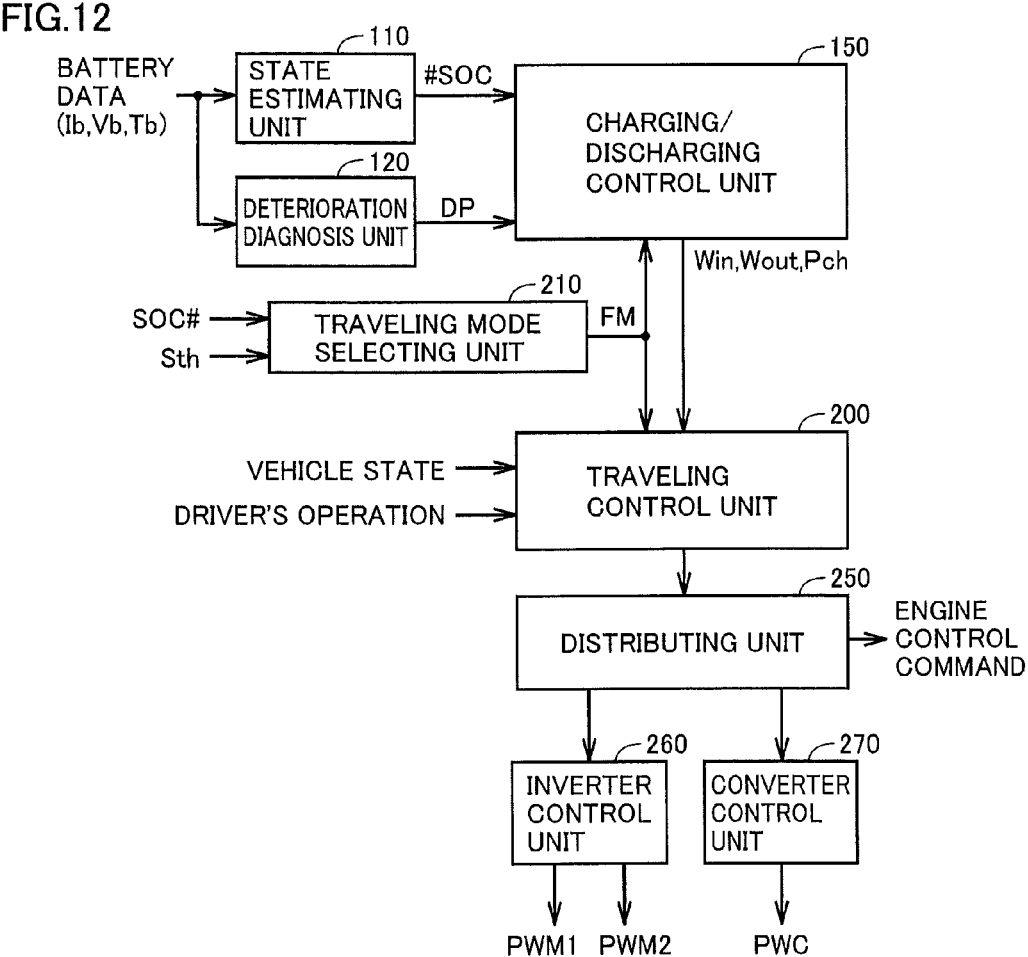
FIG. 12 is a function block diagram illustrating charging and discharging control for a power storage device provided in the electrically powered vehicle according to the second embodiment of the present invention.
Figure 13:
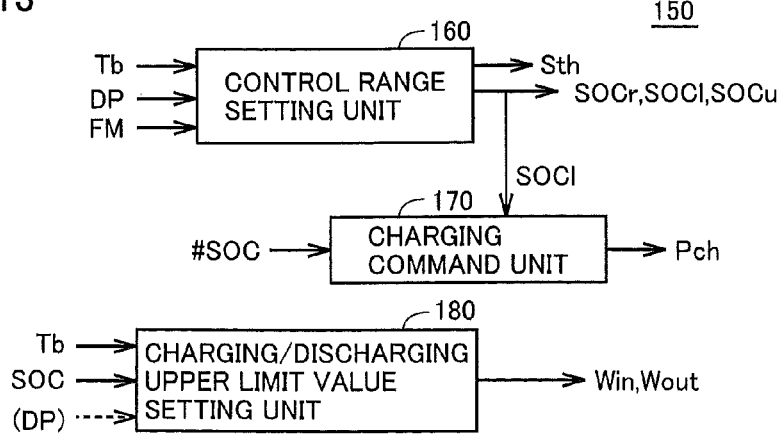
FIG. 13 is a function block diagram further illustrating a configuration of a charging/discharging control unit shown in FIG. 12.

Each of FIG. 12 and FIG. 13 shows a function block diagram illustrating charging and discharging control for the power storage device in the electrically powered vehicle according to the second embodiment of the present invention. FIG. 12 and FIG. 13 respectively correspond to FIG. 4 and FIG. 5 in the first embodiment.

Referring to FIG. 12, a traveling mode selecting unit 210 is further provided for the charging and discharging control for the power storage device in the electrically powered vehicle according to the second embodiment. Traveling mode selecting unit 210 selects one of the EV mode and the HV mode based on the SOC estimate value (#SOC) of power storage device 10 and a mode determination value Sth. Traveling mode selecting unit 210 generates a traveling mode flag FM indicating that one of the EV mode and the HV mode is selected. Traveling mode flag FM is sent to charging/discharging control unit 150 and traveling control unit 200.

Referring to FIG. 13, in the second embodiment, control range setting unit 160 sets the SOC control range (SOCr, SOCu, SOCl) in accordance with traveling mode flag FM, and battery temperature Tb and/or deterioration parameter DP. The setting of the SOC control range will be described later in detail. Further, control range setting unit 160 sets mode determination value Sth in accordance with battery temperature Tb and/or deterioration parameter DP.

Referring to FIG. 12 again, traveling mode selecting unit 210 selects the EV mode until the SOC estimate value (#SOC) falls below predetermined mode determination value Sth. In the EV mode, hybrid vehicle 5 travels actively using electric power accumulated in power storage device 10.

In other words, in the EV mode, traveling control unit 200 determines output requests for motor generators MG1, MG2 and an output request for engine 18 such that traveling is performed basically using only driving power from motor generator MG2 with engine 18 being stopped. Specifically, in the EV mode, traveling control unit 200 starts engine 18 when a special condition is established, such as the following condition: a condition in which the driver provides a driving power request for abrupt acceleration or the like; or a condition in which the driver provides a request irrelevant to the driving power such as catalyst warming or an air conditioning request. Namely, in the EV mode, by basically stopping engine 18, fuel consumption of hybrid vehicle 5 is improved. Hence, in the EV mode, the electric power generation operation performed by motor generator MG1, i.e., the internal charging is restricted. Accordingly, the SOC of power storage device 10 is monotonously decreased.

When the SOC estimate value (#SOC) of power storage device 10 is decreased to reach mode determination value Sth in the EV mode, traveling mode selecting unit 210 switches the traveling mode to the HV mode. In the HV mode, the internal charging by motor generator MG1 is controlled to maintain the SOC of power storage device 10 within a certain SOC control range. Namely, engine 18 starts to operate in response to a request of the internal charging performed by motor generator MG1. It should be noted that part of driving power generated by the operation of engine 18 may be used for the traveling of hybrid vehicle 5.

In the HV mode, traveling control unit 200 determines the output requests for motor generators MG1, MG2 and the output request for engine 18 so as to optimize overall fuel consumption while maintaining the SOC of power storage device 10.

It should be noted that the user can forcibly select the HV mode by operating selection switch 26, i.e., can cancel the selection of the EV mode. Meanwhile, when selection switch 26 is not operated, traveling mode selecting unit 210 automatically selects the traveling mode based on the SOC estimate value (#SOC) of power storage device 10 as described above.

Figure 14:
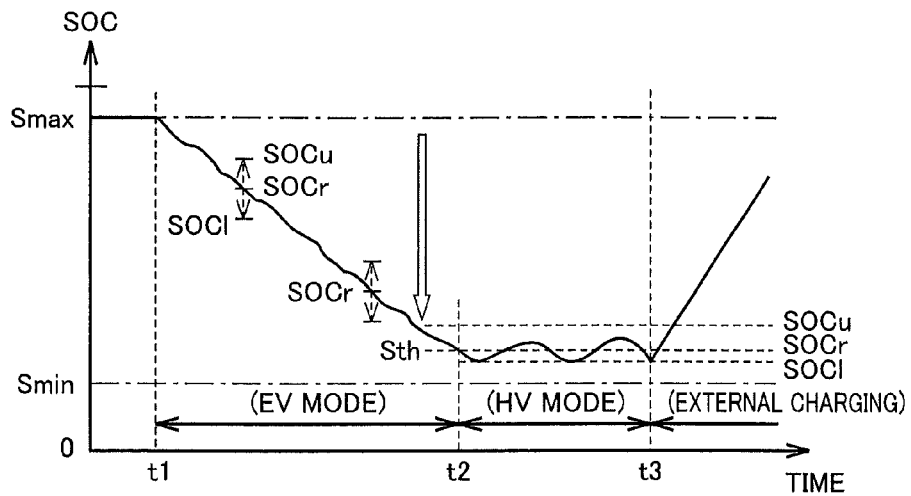
FIG. 14 is a conceptual diagram illustrating a gist of SOC control for the power storage device provided in the electrically powered vehicle according to the second embodiment of the present invention.

FIG. 14 shows representative transition of the SOC of power storage device 10 in the electrically powered vehicle of the second embodiment.

Referring to FIG. 14, in hybrid vehicle 5 according to the second embodiment, at the start of vehicle traveling (time t1), power storage device 10 has been externally charged to a value near the SOC upper limit value. When an ignition switch is turned on to start traveling of hybrid vehicle 5, the EV mode is selected because the SOC estimate value (#SOC) is higher than mode determination value Sth.

By traveling in the EV mode, the SOC of power storage device 10 is gradually decreased. In the EV mode, control center value SOCr of the SOC control range is set to correspond to the SOC estimate value (#SOC) at the present state. In other words, in the EV mode, as the SOC is decreased, the SOC control range is decreased. As a result, in the EV mode, engine 18 is not started to internally charge power storage device 10.

When the SOC estimate value (#SOC) is decreased to reach mode determination value Sth (time t2), the traveling mode is changed from the EV mode to the HV mode. When transitioned to the HV mode, control center value SOCr is set at a constant value for the HV mode. Accordingly, control lower limit value SOCl is also maintained at a constant value. As a result, in the HV mode, when the SOC is decreased, engine 18 (FIG. 11) starts to operate, thereby charging power storage device 10 with electric power generated by motor generator MG1. As a result, the SOC starts to be increased and is accordingly maintained in the SOC control range (SOCl to SOCu).

It should be noted that when the HV mode is forcibly selected by operating selection switch 26 during the EV mode (#SOC>Sth), charging/discharging of power storage device 10 is controlled to maintain the SOC thereof at that moment. Specifically, the SOC control range is set to fix control center value SOCr to the SOC estimate value (#SOC) obtained at the moment of the operation of selection switch 26.

When the traveling of hybrid vehicle 5 is ended, the driver connects connector portion 350 (FIG. 10) to hybrid vehicle 5, thereby starting external charging (time t3). Accordingly, the SOC of power storage device 10 starts to be increased.

Also in the electrically powered vehicle according to the second embodiment, as with the first embodiment, control lower limit value SOCl of the SOC is increased in the case of decreased performance of power storage device 10.

Figure 15:
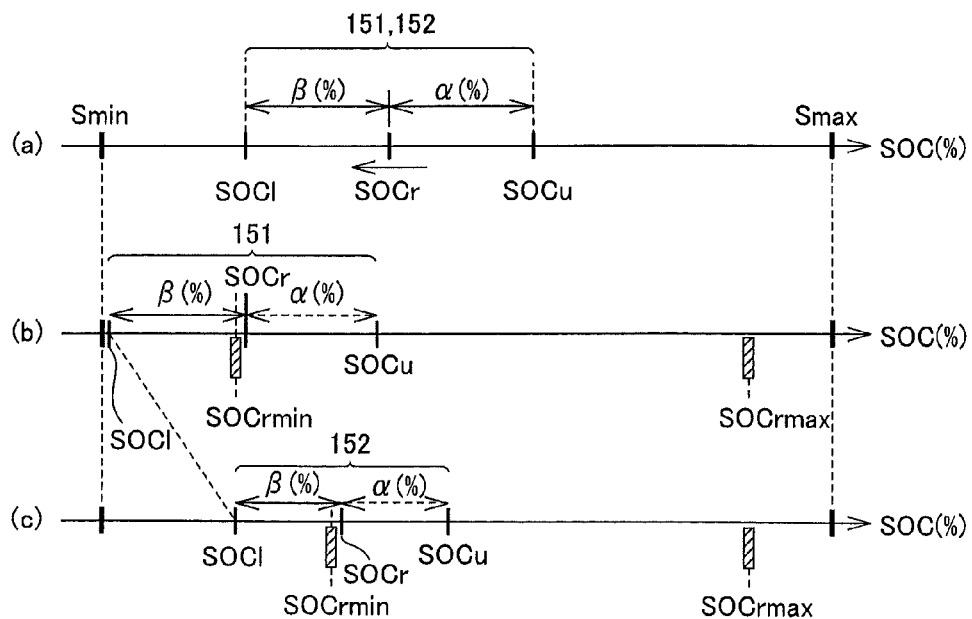
FIG. 15 is a conceptual view illustrating setting of a SOC control range by a control range setting unit shown in FIG. 13.

FIG. 15 is a conceptual view illustrating the setting of the SOC control range by control range setting unit 160 (FIG. 13) in the electrically powered vehicle of the second embodiment.

Referring to FIG. 15($a$), in the electrically powered vehicle according to the second embodiment, SOC control range 151 is defined in accordance with control center value SOCr, a predetermined control width α (%) for the upper limit side, and a predetermined control width β (%) for the lower limit side. This is because control center value SOCr is changed according to the decrease of the SOC during the EV mode as illustrated in FIG. 14. When control center value SOCr is defined, control upper limit value SOCu can be automatically determined from SOCu=SOCr+α (%). Likewise, control lower limit value SOCl is automatically determined from SOCl=SOCr−β. It should be noted that α=β can be also set.

Further, an upper limit guard value SOCrmax and a lower limit guard value SOCrmin are set relative to control center value SOCr. Namely, throughout the EV mode and the HV mode, they are set to a range of SOCrmin≤SOCr≤SOCrmax. Upper limit guard value SOCrmax and lower limit guard value SOCrmin are set such that control upper limit value SOCu and control lower limit value SOCl set relative to control center value SOCr have margins for management upper limit value Smax and management lower limit value Smin. As a result, even when control center value SOCr is changed, SOC control range 151 is protected from falling out of the range from management lower limit value Smin to management upper limit value Smax.

As with FIG. 6($a$), FIG. 15($b$) shows SOC control range 151 in the case of normal state, i.e., in the case of normal temperature and no deterioration of power storage device 10. In the case of normal state, discharging to a value near management lower limit value Smin is permitted to effectively use electric power accumulated in power storage device 10. Hence, control range setting unit 160 sets SOC control range 151 so as to permit decrease of control lower limit value SOCl to default value S0 in the first embodiment or a similar value. For example, lower limit guard value SOCrmin for the control center value is set to satisfy SOCrmin=S0+β.

As with FIG. 6(b), FIG. 15(c) shows SOC control range 152 in the case of decreased performance of power storage device 10 (in the case of low temperature and/or deterioration thereof). Control range setting unit 160 sets SOC control range 152 to increase the minimum value of control lower limit value SOCl to be higher than that in the normal state. For example, control range setting unit 160 increases lower limit guard value SOCrmin of the control center value to be higher than that in the case of FIG. 15(b). Specifically, lower limit guard value SOCrmin is increased such that control lower limit value SOCl when control center value SOCr=SOCrmin becomes equivalent to a value of FIG. 6(b).

Accordingly, throughout the HV mode and the EV mode, the lower limit value (SOCl) of the SOC control range 151 in the case of normal state becomes equivalent to that in FIG. 6(a), and the lower limit value (SOCl) of SOC control range 152 in the case of decreased performance of power storage device 10 becomes equivalent to that in FIG. 6(b). On the other hand, upper limit guard value SOCrmax for the control center value is constant between the case of normal state (FIG. 15(b)) and the case of decreased performance (FIG. 15(c)).

Figure 16:
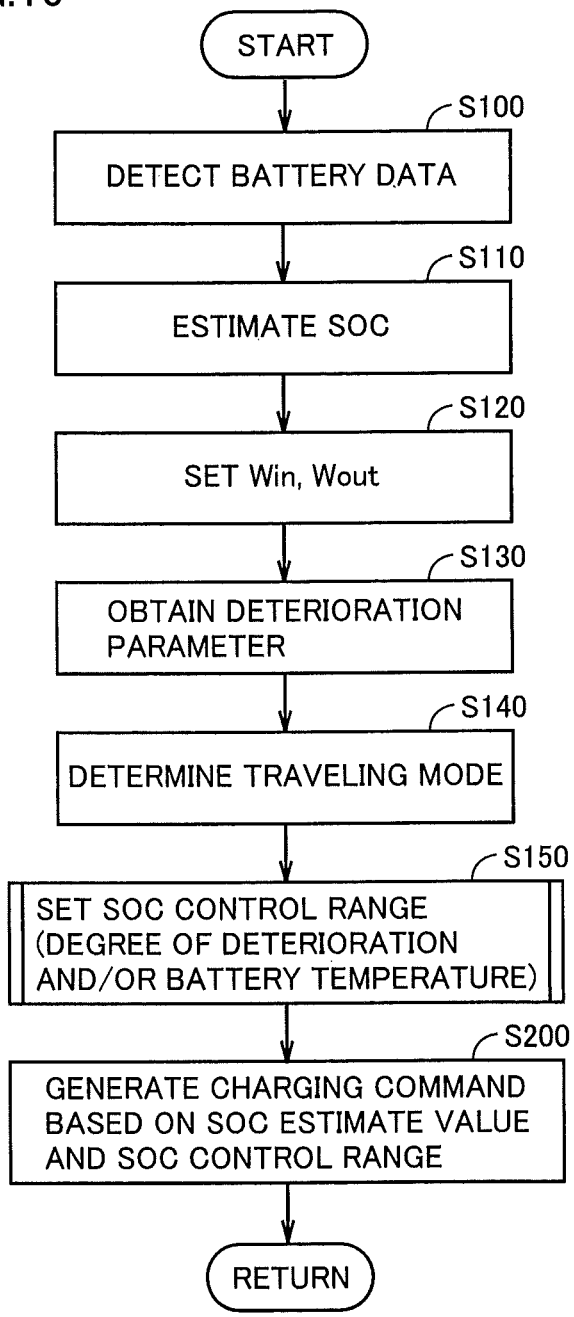
FIG. 16 is a flowchart showing a procedure of a control process for implementing the charging and discharging control for the power storage device provided in the electrically powered vehicle according to the second embodiment of the present invention.

FIG. 16 shows a procedure of the charging and discharging control for power storage device 10 in the electrically powered vehicle according to the second embodiment of the present invention.

Referring to FIG. 16, in steps S100 to S130 similar to those in FIG. 9, control device 100 detects the battery data, estimates the SOC, sets the charging and discharging power upper limit values (Win, Wout), and obtains the deterioration parameter (DP). In a step S140, control device 100 determines the traveling mode. Accordingly, one of the HV mode and the EV mode is selected as the traveling mode. The process in step S140 corresponds to the function of traveling mode selecting unit 210 shown in FIG. 12.

In a step S150, control device 100 sets the SOC control range.

Figure 17:
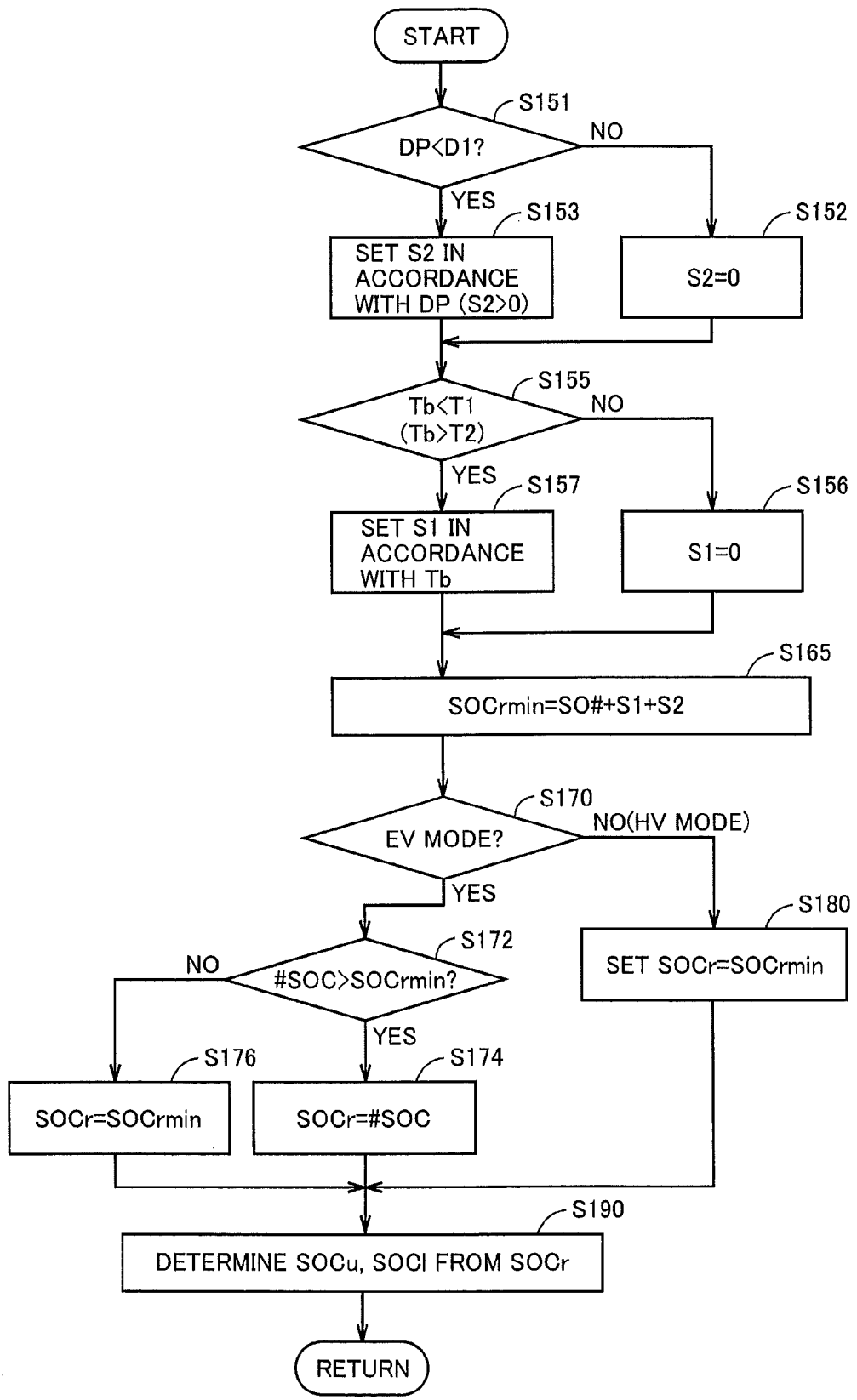
FIG. 17 is a flowchart illustrating a procedure of a process of setting the SOC control range in the second embodiment in detail.

FIG. 17 is a flowchart showing the process of step S150 in FIG. 16 in detail so as to illustrate the SOC control range in the second embodiment.

Referring to FIG. 17, in steps S151 to S157 similar to those in FIG. 10, control device 100 sets modification amount S2 in accordance with deterioration parameter DP and sets modification amount S1 in accordance with battery temperature Tb. In a step S165, control device 100 sets lower limit guard value SOCrmin for the control center value in accordance with a total of a default value S0#, modification amount S1, and modification amount S2. Default value S0# corresponds to lower limit guard value SOCrmin (for example, S0+β) in FIG. 15(b).

In a step S170, control device 100 determines whether or not the traveling mode is the EV mode. When the traveling mode is the EV mode (determined as YES in S170), control device 100 compares the SOC estimate value (#SOC) with lower limit guard value SOCrmin in a step S172. When #SOC is higher than lower limit guard value SOCrmin (determined as YES in S170), control device 100 sets the present SOC estimate value at control center value SOCr (SOCr=#SOC) in a step S174.

On the other hand, when the SOC estimate value is lower than lower limit guard value SOCrmin (determined as NO in S170), control device 100 sets lower limit guard value SOCrmin at control center value SOCr (SOCr=SOCrmin) in a step S176. Thus, in the EV mode, control center value SOCr is set to change according to the SOC estimate value (#SOC) while being guarded from falling below lower limit guard value SOCrmin. Accordingly, control lower limit value SOCl is also changed in a range not below default value S0.

On the other hand, in the HV mode (determined as NO in S170), in a step S280, control device 100 sets control center value SOCr in accordance with lower limit guard value SOCrmin calculated in step S165. Representatively, control center value SOCr=SOCrmin may be set. Alternatively, lower limit guard value SOCrmin with a predetermined margin added may be employed as control center value SOCr. In the HV mode, control center value SOCr is constant irrespective of the change of the SOC estimate value. However, as described above, in the case where the HV mode is forcibly selected by the operation of selection switch 26, control center value SOCr is fixed to the SOC estimate value (#SOC) obtained at the moment of the operation of selection switch 26.

Further, in a step S190, control device 100 determines control upper limit value SOCu and control lower limit value SOCl so as to secure predetermined control widths α, β for control center value SOCr set in step S174, S176, or S180.

As described above, the electrically powered vehicle according to the second embodiment has the externally chargeable power storage device, and travels with the selection of the EV mode and the HV mode being made. As with the first embodiment, also in the electrically powered vehicle according to the second embodiment, in the case of decreased performance of power storage device 10 (in the case of low temperature and/or proceeded deterioration thereof), the lower limit value of the SOC control range can be increased to be higher than that in the normal state.

Accordingly, even in the event that the decreased performance of power storage device 10 (increase of the internal resistance or the like) makes it difficult to secure output electric power in the low SOC region, decrease of driveability of hybrid vehicle 5 and starting failure and decrease of startability of engine 18 can be avoided which are otherwise caused by insufficient output electric power from power storage device 10. Meanwhile, in the case of normal state (in the case of normal temperature and no deterioration), electric power accumulated in power storage device 10 can be used up to the management lower limit region, thus improving energy efficiency (fuel consumption).

In the first and second embodiments, the lower limit value of the SOC control range is set in accordance with both the temperature and the deterioration state of power storage device 10, but the lower limit value of the SOC control range may be set in accordance with only one of the temperature and the deterioration state. In this case, one of modification amounts S1, S2 is fixed to zero.

Further, in the setting of the SOC control range in the second embodiment, the control widths (α, β) are set relative to control center value SOCr, but another manner of setting can be applied. In other words, as also described in the first embodiment, any manner of setting can be applied as long as in the case of decreased performance of power storage device 10, the lower limit value of the SOC control range can be increased to be higher than that in the normal state. However, it is preferable to set the SOC control range by setting control center value SOCr as illustrated in the second embodiment, in order to smoothly perform the charging and discharging control throughout the EV mode and the HV mode.

[Third Embodiment]

In the first and second embodiments, in the case of decreased performance of the power storage device provided in the vehicle, the SOC control range is changed to avoid the low SOC region, thereby avoiding insufficient output electric power of the power storage device provided in the vehicle. In a third embodiment, the following describes charging control for more directly avoiding insufficient output electric power of the power storage device of the vehicle in favor of securing vehicle driveability.

Figure 18:
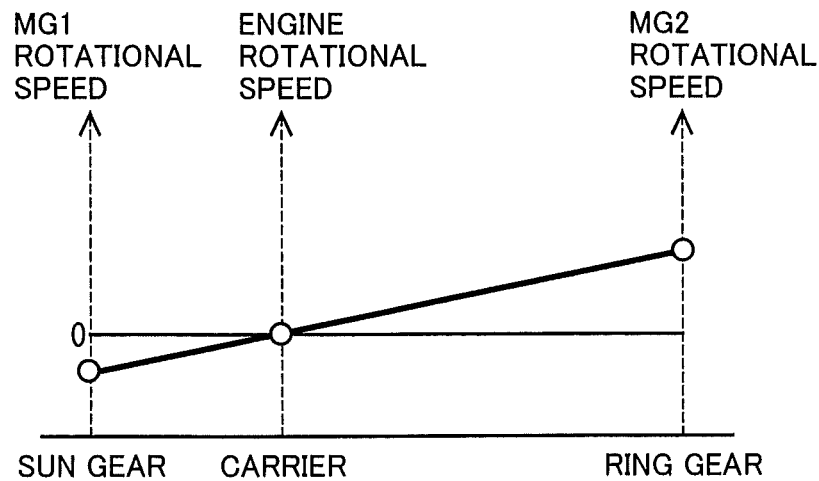
FIG. 18 is a first nomographic chart upon starting an engine of the hybrid vehicle.
Figure 19:
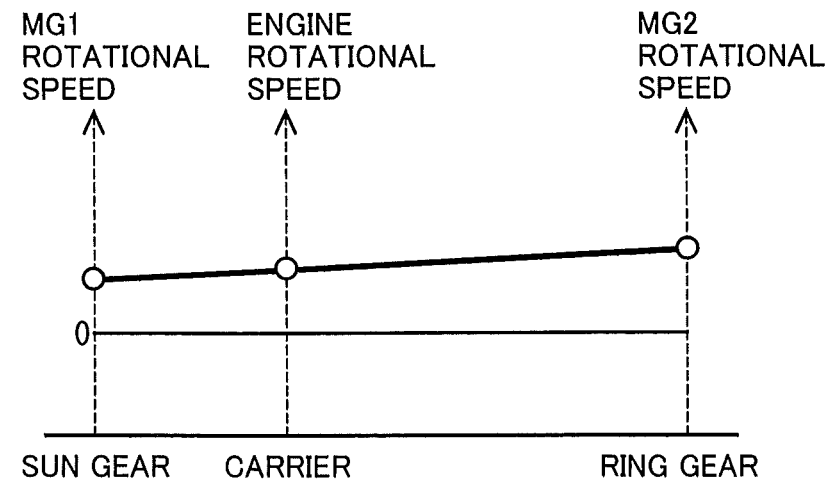
FIG. 19 is a second nomographic chart upon starting the engine of the hybrid vehicle.

Each of FIG. 18 and FIG. 19 shows a nomographic chart when starting engine 18 of hybrid vehicle 5 shown in each of FIG. 1 and FIG. 11.

Referring to FIG. 18, when hybrid vehicle 5 travels only using driving power of motor generator MG2 with engine 18 being stopped, MG2 rotational speed becomes positive and MG1 rotational speed becomes negative.

When starting engine 18 from the state of FIG. 18, motor generator MG1 operates as a motor to crank engine 18 using motor generator MG1. Accordingly, the MG1 rotational speed is changed from negative to positive. When motor generator MG1 generates positive torque for motoring, motor generator MG1 generates electric power in the region in which the MG1 rotational speed is negative, and motor generator MG1 consumes electric power in the region in which MG1 rotational speed is positive. When the engine is started, the electric power generated by motor generator MG1 is supplied to power storage device 10 and the electric power to be consumed by motor generator MG1 is supplied from power storage device 10.

As understood from the nomographic charts of FIG. 18 and FIG. 19, electric power required to start engine 18 from the stop state differs depending on the vehicle state (representatively, vehicle speed). If power storage device 10 cannot securely output the electric power thus required, it is difficult to securely start engine 18. Meanwhile, in order to charge power storage device 10 during traveling, engine 18 needs to be operated.

Hence, during traveling of hybrid vehicle 5, it is preferable to maintain the state in which power storage device 10 secures electric power required to start engine 18 from the stop state or electric power required to restart engine 18 after stopping engine 18 in an operation state.

In view of this, in the third embodiment, additional charging control for power storage device 10 is performed in the electrically powered vehicle (hybrid vehicle) to guarantee engine startability, in addition to the charging and discharging control illustrated in the first and second embodiments.

Figure 20:
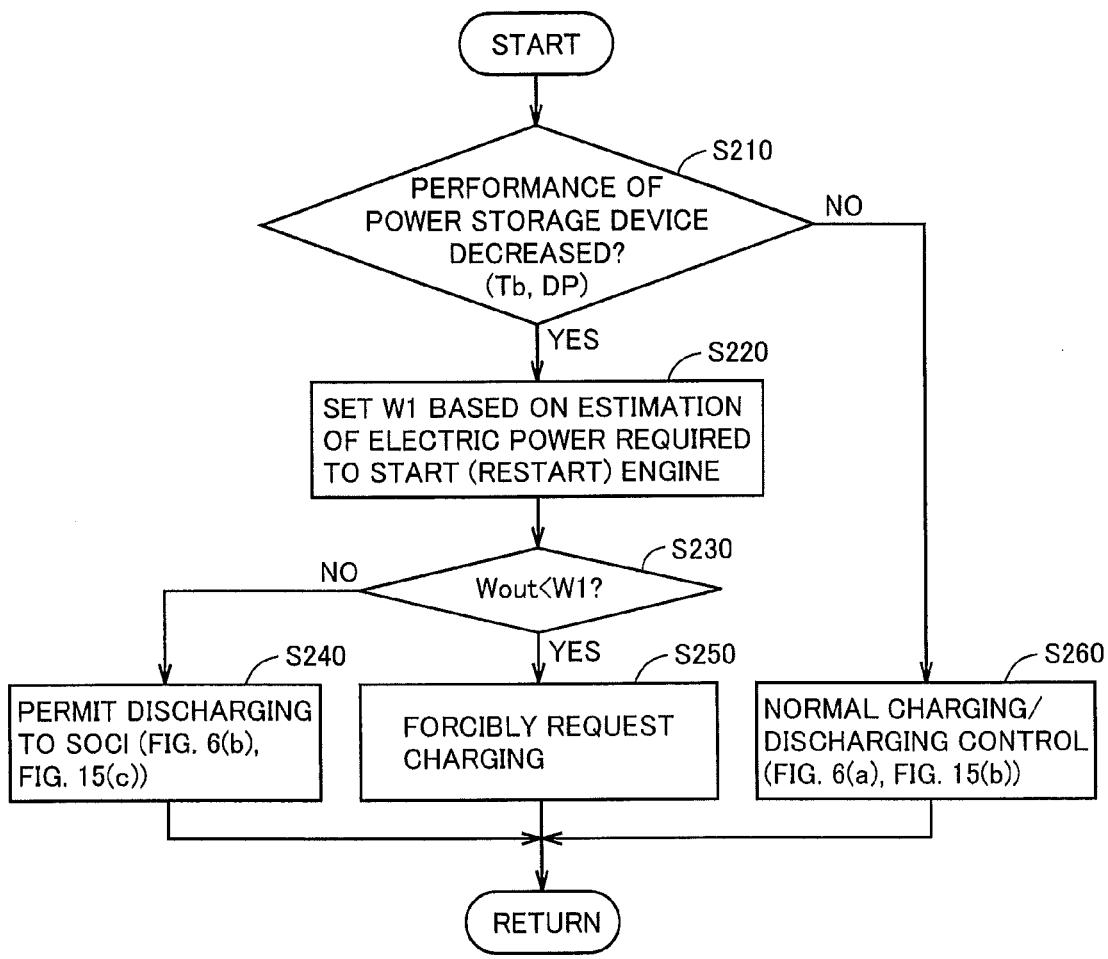
FIG. 20 is a flowchart for illustrating a feature of charging and discharging control for a power storage device provided in an electrically powered vehicle according to a third embodiment.

FIG. 20 is a flowchart for illustrating a feature of the charging and discharging control for the power storage device of the electrically powered vehicle in the third embodiment.

In the charging and discharging control for the power storage device of the electrically powered vehicle in the third embodiment, step S200 (charging command) in the flowchart of each of FIG. 9 (the first embodiment) and FIG. 16 (the second embodiment) is performed in accordance with a flowchart of FIG. 20. Other control operations may be performed in a similar manner to that in the first or second embodiment and is therefore not described in detail repeatedly.

Referring to FIG. 20, in a step S210, control device 100 determines whether or not the performance of power storage device 10 has been decreased (the temperature thereof is low and/or power storage device 10 has been deteriorated) as described in the first and second embodiments. Namely, in FIG. 10 or FIG. 17, when it is determined as YES in at least one of steps S151 and S155, it is determined as YES in step S210. Otherwise, it is determined as NO in step S210.

When the performance of power storage device 10 has been decreased (determined as YES in S210), in a step S220, control device 100 estimates a value of electric power required to start engine 18, and sets a criterion value W1 based on a result of this estimation. Criterion value W1 is set to have a margin for electric power to be output from power storage device 10 and required to start engine 18 or restart engine 18 after stopping engine 18. As described above, the electric power required to start the engine is changed depending on the vehicle speed of hybrid vehicle 5. Further, in the case of low temperature, electric power required to start the engine may be increased due to decreased viscosity of lubricating oil. Hence, criterion value W1 is preferably set to be variable according to vehicle states such as the vehicle speed and the temperature.

In a step S230, control device 100 compares discharging power upper limit value Wout at present with criterion value W1. As described above, the SOC estimate value (#SOC) and battery temperature Tb at present are reflected in discharging power upper limit value Wout.

When discharging power upper limit value Wout is lower than criterion value W1 (determined as YES in S230), control device 100 proceeds the process to a step S250 to forcibly generate a request for charging power storage device 10, irrespective of the SOC thereof. In other words, Pch>0 is set.

On the other hand, when discharging power upper limit value Wout is larger than criterion value W1 (determined as NO in S230), control device 100 permits discharging to control lower limit value SOCl in step S240. As a result, no forcible request for charging is generated unlike in step S250. Hence, whether to charge is determined in accordance with the SOC estimate value (#SOC). For example, when #SOC is decreased to SOCl, charging power command value Pch is set to satisfy Pch>0. On the other hand, while #SOC>SOCl, Pch=0 is maintained. On this occasion, the SOC control range (control lower limit value SOCl) is applied which is set in accordance with FIG. 6(b) or FIG. 15(c) in the first or second embodiment and shifted to the upper limit side as compared with that in the normal state.

Meanwhile, when the performance of power storage device 10 has not been decreased (determined as NO in S210), in a step S260, control device 100 performs normal charging and discharging control. Specifically, whether to charge power storage device 10 is determined in accordance with normal control lower limit value SOCl (default value) set in accordance with FIG. 6(a) or FIG. 15(b) in the first or second embodiment.

According to the charging and discharging control for the electrically powered vehicle in the third embodiment, as with the first and second embodiments, the SOC control range is shifted when the performance of power storage device 10 has been decreased, so as to avoid decrease of driveability of hybrid vehicle 5 otherwise caused by insufficient output electric power from power storage device 10. Further, in the third embodiment, the charging of power storage device 10 is controlled such that discharging power upper limit value Wout of power storage device 10 does not fall below the output electric power required to start the engine. Accordingly, engine 18 can be securely started as required by the vehicle state or the user's operation. As a result, decrease of driveability of hybrid vehicle 5 can be avoided more securely which is otherwise caused by insufficient output electric power from power storage device 10.

In each of the first to third embodiments, as an exemplary electrically powered vehicle, there has been illustrated the vehicle configured to have engine 18 mounted as a driving power source and to generate electric power using an output of engine 18 so as to charge power storage device 10. However, application of the present invention is not limited to such an electrically powered vehicle. Specifically, the present invention can be actually applied to any electrically powered vehicle as long as the electrically powered vehicle is provided with a power generating structure for charging a power storage device of the electrically powered vehicle during traveling. For example, the present invention can be also applied to a hybrid vehicle having a hybrid configuration different from that of each of FIG. 1 and FIG. 11 (for example, so-called "series hybrid configuration" or "electrical distribution type hybrid configuration") or can be also applied to a fuel cell vehicle.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention can be applied to an electrically powered vehicle including a power storage device, and a power generating structure for generating charging power for the power storage device of the vehicle during vehicle traveling.

REFERENCE SIGNS LIST

5: hybrid vehicle; 6: converter; 7: system main relay; 8-1, 8-2: inverter; 10: power storage device; 11: monitoring unit; 12: temperature sensor; 13, 16: voltage sensor; 14: current sensor; 18: engine; 22: power split device; 24F: driving wheel; 26: selection switch; 30: externally charging unit; 30a: current control unit; 30b: voltage converting unit; 50: power control unit; 90: connector receiving portion; 90a: connection detection sensor; 95: speed reducer; 100: control device (ECU); 110: state estimating unit; 120: deterioration diagnosis unit; 150: charging/discharging control unit; 151: SOC control range (in the case of normal state); 152: SOC control range (in the case of decreased performance); 160: control range setting unit; 170: charging command unit; 180: charging/discharging upper limit value setting unit; 200: traveling control unit; 202: sun gear; 204: pinion gear; 206: carrier; 208: ring gear; 210: traveling mode selecting unit; 250: distributing unit; 260: inverter control unit; 270: converter control unit; 350: connector portion; C: smoothing capacitor; CNL: negative charging line; CON: connection signal; CPL: positive charging line; D1: criterion value; DP: deterioration parameter; FM: traveling mode flag; Ib: battery current; MG1: motor generator (power generating structure); MG2; motor generator (driving power source); MNL: negative bus; MPL: positive bus; NL: negative line; PL: positive line; PSL: power line; PWC, PWM1, PWM2: switching command; Pch: charging power command value; S0: default value (SOC control lower limit value); S1, S2: modification amount (SOC control lower limit value); SE: relay control signal; SOCl: SOC control lower limit value; SOCr: control center value; SOCrmax: upper limit guard value (SOC control center value); SOCrmin: lower limit guard value (SOC control center value); SOCu: SOC control upper limit value; Smax: SOC management upper limit value; Smin: SCO management lower limit value; Sth: mode determination value; T1, T2, D1, W1: criterion value; Tb: battery temperature; Vb: battery voltage; Vh: DC voltage; Win: charging power upper limit value; Wout: discharging power upper limit value.

The invention claimed is:

1. An electrically powered vehicle comprising:
a first motor serving as a driving power source;
a power storage device configured to send/receive electric power to/from said first motor;
a power generating structure for generating charging power for said power storage device during vehicle traveling;
a charge state estimating unit for estimating a remaining amount in said power storage device based on a state value of said power storage device;
a deterioration diagnosis unit for obtaining a deterioration parameter indicating a deterioration state of said power storage device;
a charging/discharging control unit for controlling charging/discharging of said power storage device such that the remaining amount estimate value provided by said charge state estimating unit does not fall out of a control range during said vehicle traveling;
an internal combustion engine serving as a driving power source;
an externally charging structure configured to charge said power storage device using an electric power source external to the vehicle; and
a traveling mode selecting unit for selecting a first traveling mode until said remaining amount estimate value is decreased to a mode determination value and for selecting a second traveling mode after said remaining amount estimate value is decreased to said mode determination value, said first traveling mode being such that the traveling is performed actively using electric power accumulated in said power storage device, said second traveling mode being such that the traveling is performed to maintain the electric power accumulated in said power storage device,
said charging/discharging control unit including
a control range setting unit for setting said control range, and
a charging command unit for causing said power generating structure to generate said charging power at least when said remaining amount estimate value reaches a lower limit value of said control range,
said control range setting unit increasing said lower limit value from a first value to a second value when at least one of a first condition and a second condition is established, said first condition being such that a temperature of said power storage device is lower than a predetermined temperature, said second condition being such that said deterioration parameter reaches a predetermined level,
said control range being set in accordance with a combination of a control center value and a predetermined control width of said remaining amount,
in said first traveling mode, said control range setting unit changing said control center value within a range not exceeding a setting lower limit value, in accordance with said remaining amount estimate value, and in said second traveling mode, said control range setting unit setting said control center value at a constant value,
when at least one of said first and second conditions is established, said control range setting unit increasing said setting lower limit value in said first traveling mode as compared with said setting lower limit value when both said first and second conditions are not established.

2. The electrically powered vehicle according to claim 1, wherein said control range setting unit increases said mode determination value, when at least one of said first and second conditions is established in said first traveling mode.

3. The electrically powered vehicle according to claim 1, wherein said control range setting unit increases said constant value when at least one of said first and second conditions is established in said second traveling mode.

4. The electrically powered vehicle according to claim 1, wherein said control range setting unit sets said lower limit value in accordance with a total of said first value, which is a default value, a first modification amount set to be variable according to the temperature of said power storage device, and a second modification amount set to be variable according to said deterioration parameter.

5. A method for controlling an electrically powered vehicle including a first motor, a power storage device, a power generating structure, an internal combustion engine, and an externally charging structure, said first motor serving as a driving power source, said power storage device being configured to send/receive electric power to/from said first motor, said power generating structure being for generating charging power for said power storage device during vehicle traveling, said internal combustion engine serving as a driving power source, said externally charging structure being configured to charge said power storage device using an electric power source external to the vehicle, the method comprising the steps of:

calculating a remaining amount estimate value in said power storage device based on a state value of said power storage device;

obtaining a deterioration parameter indicating a deterioration state of said power storage device;

setting a control range for said remaining amount estimate value; and commanding said power generating structure to generate said charging power at least when said remaining amount estimate value reaches a lower limit value of said control range, the step of setting including the step of increasing said lower limit value from a first value to a second value when at least one of a first condition and a second condition is established, said first condition being such that a temperature of said power storage device is lower than a predetermined temperature, said second condition being such that said deterioration parameter reaches a predetermined level, the method further comprising the step of selecting a first traveling mode until said remaining amount estimate value is decreased to a mode determination value, and a second traveling mode after said remaining amount estimate value is decreased to said mode determination value, said first traveling mode being such that the traveling is performed actively using electric power accumulated in said power storage device, said second traveling mode being such that the traveling is performed to maintain the electric power accumulated in said power storage device, said control range being set in accordance with a combination of a control center value and a predetermined control width of said remaining amount estimate value, the step of setting including the steps of in said first traveling mode, changing said control center value within a range not exceeding a setting lower limit value, in accordance with said remaining amount estimate value, in said second traveling mode, setting said control center value at a constant value, and when at least one of said first and second conditions is established, increasing said setting lower limit value as compared with said setting lower limit value when both said first and second conditions are not established.

6. The method for controlling the electrically powered vehicle according to claim 5, wherein the step of setting increases said mode determination value in said first traveling mode when at least one of said first and second conditions is established.

7. The method for controlling the electrically powered vehicle according to claim 5, wherein the step of setting increases said constant value in said second traveling mode when at least one of said first and second conditions is established.

8. The method for controlling the electrically powered vehicle according to claim 5, wherein the step of setting includes the step of setting said lower limit value in accordance with a total of said first value, which is a default value, a first modification amount set to be variable according to the temperature of said power storage device, and a second modification amount set to be variable according to said deterioration parameter.

* * * * *